United States Patent [19]
Ogishi et al.

[11] Patent Number: 5,147,730
[45] Date of Patent: Sep. 15, 1992

[54] STEEL PLATE WITH ORGANIC COATING HAVING IMPROVED CORROSION RESISTANCE

[75] Inventors: Hideo Ogishi; Shigeru Umino; Kenji Takao; Hajime Kimura; Koji Yamato, all of Chiba, Japan

[73] Assignees: Kawasaki Steel Corp.; Dai Nippon Toryo Co., Ltd., Japan

[21] Appl. No.: 790,142

[22] Filed: Nov. 7, 1991

Related U.S. Application Data

[63] Continuation of Ser. No. 485,455, Feb. 27, 1990, abandoned.

[30] Foreign Application Priority Data

| Feb. 27, 1989 | [JP] | Japan | 1-45976 |
| Feb. 27, 1989 | [JP] | Japan | 1-45977 |
| Jun. 21, 1989 | [JP] | Japan | 1-159324 |
| Jul. 26, 1989 | [JP] | Japan | 1-193753 |

[51] Int. Cl.$^5$ .................................. B32B 15/04
[52] U.S. Cl. .................... 428/623; 428/626; 428/632; 428/633; 428/659
[58] Field of Search ............... 428/623, 626, 632, 633, 428/659, 684

[56] References Cited

U.S. PATENT DOCUMENTS

| 4,411,964 | 10/1983 | Hara et al. | 428/632 |
| 4,659,394 | 4/1987 | Hara et al. | 428/623 |
| 4,775,600 | 10/1988 | Adaniya et al. | 428/623 |
| 4,889,775 | 12/1989 | Adaniya et al. | 428/623 |

FOREIGN PATENT DOCUMENTS

| 0017232 | 4/1980 | European Pat. Off. . |
| 0172624 | 2/1986 | European Pat. Off. . |
| 3151115 | 12/1981 | Fed. Rep. of Germany . |
| 3432118 | 3/1985 | Fed. Rep. of Germany . |
| 2604729 | 4/1988 | France . |
| 1-8033 | 1/1989 | Japan . |

*Primary Examiner*—George Wyszomierski
*Attorney, Agent, or Firm*—Austin R. Miller

[57] ABSTRACT

The improved corrosion-resistant steel plate with an organic coating comprises a steel plate having a zinc or zinc alloy plate layer which is overlaid with a chromate film which in turn is coated with an organic resin paint film. The organic resin coat comprises an epoxy resin having a dialkanolamine incorporated into its bisphenol A skeleton, an amino resin, and silica. The dialkanolamine combines with the amino resin to provide satisfactory curability at low temperatures; at the same time, it combines with the silica to provide a satisfactory film reinforcing effect. The organic coat formed of this composition can be effectively cured at low temperatures and yet it will neither dissolve nor soften upon swelling under the action of the alkali that is generated during cationic electrodeposition at the interface between the electrodeposited film and the organic coat. Thus, the organic coat has good paint adhesion, high corrosion resistance, as well as good workability and weldability and makes the steel plate suitable for use as an automotive part after painting. If the proportion of trivalent chromium in the chromate film and the amounts of zinc oxide and silica sol to be incorporated as additives are properly adjusted, the organic coating will exhibit satisfactory resistance to chromium dissolution and hence its paint adhesion and corrosion resistance are further improved to make the steel plate more suitable for use as an automotive part after painting.

17 Claims, No Drawings

STEEL PLATE WITH ORGANIC COATING HAVING IMPROVED CORROSION RESISTANCE

This application is a continuation of application Ser. No. 07/485,455, filed Feb. 27, 1990, abandoned.

BACKGROUND OF THE INVENTION

1. Field of the Invention

This invention relates to a rust preventive steel plate with organic coating for use in automotive parts that has improved cationic electrodeposition quality, workability, weldability, corrosion resistance and resistance to chromium dissolution.

2. Description of the Prior Art

In response to the growing need for increasing the corrosion resistance of automotive steel plates, various types of corrosion preventive steel plates have been proposed and are being gradually accepted by the industry. The first to be mentioned of these corrosion preventive steel plates are plated ones such as those prepared by hot dipping molten zinc or zinc alloys or by electroplating zinc or zinc alloys. However, these plated steel plates are not completely satisfactory for use in curled or hemmed portions of inner plates of car bodies where particularly high corrosion resistance is required on the surface.

Zinc chromated steel plates provided with zinc-rich coatings are known to have high corrosion resistance. However, if such steels having corrosion preventive coatings are subjected to mechanical working such as press forming, the coating can separate from the substrate to cause deterioration in corrosion resistance.

With a view to solving these problems, it was recently proposed that thin organic films (0.3-3 μm) entirely free from electroconductive pigments be formed on the substrate plate of steel plates to make them amenable to subsequent coating by electrodeposition. Such steel plates are described in Japanese Laid-Open (kokai) Application Nos. 62-289274, 63-22637 and 63-35798. These steel plates with organic coatings are improved in many aspects including corrosion resistance, weldability, press formability, appearance after electrodeposition, and the waterproofing secondary adhesion of intermediate coats on the electrodeposited film. However, these improvements can only be achieved when the organic coating is fully crosslinked with a crosslinking agent.

One of the practices gaining popularity today is to make steel plates of "bake hardenable" materials that have low yield strength prior to press forming but that will increase in yield strength upon baking of subsequently coated films. In order to fully exploit the bake hardenability of such materials, the heating of organic coatings for drying and curing them must be performed at temperatures not higher than 150° C. In special cases where high production rates are of primary importance, it is required that the temperature of 150° C. be reached within one minute and that no retention time be provided. These requirements are very strict and unfavorable for the purpose of completely drying and curing the organic coatings. In fact, the conventional organic coatings are made of resin systems that should be fully crosslinked in order to exhibit their intended functions, so they cannot be crosslinked by a satisfactory degree if they are subjected to the low-temperature, rapid heating described above. During subsequent cationic electrodeposition, such insufficiently crosslinked organic coatings will dissolve or become soft upon swelling on account of the alkali that is generated at the interface between the electrodeposited coating and the organic coating, to thereby deteriorate the appearance, paint adhesion and corrosion resistance of the applied coatings.

BRIEF SUMMARY OF THE INVENTION

A first object, therefore, of the present invention is to solve the aforementioned problems of the prior art and provide a steel plate that has an organic coating that can be cured by low-temperature, rapid heating and which yet has improved properties such as good electrodeposition quality, strong paint adhesion and high corrosion resistance.

Steel plates with organic coatings are by themselves effective in preventing corrosion but in order to achieve further improvements in corrosion resistance, chromating is often applied to the substrate plate to prepare for the provision of organic coatings. The usual process of painting operations in the production line of automobiles consists of making parts in blank form, assembling them, degreasing with alkalies, chemical conversion, primer coating by electrodeposition, intercoating, and top-coating. If ordinary chromates are used in the surface preparation of the substrate plate, chromium will sometimes dissolve out during alkali cleaning and chemical conversion steps to cause difficulties in the treatment of effluents discharged from the paint shop. A further problem associated with the use of chromates is that depending on use conditions, separation can occur at the interface between the chromate film and the organic coating in a very humid condition (immersion in pure water at 50° C. for 10 days). This phenomenon is commonly referred to as "deterioration in waterproofing secondary adhesion".

A second object, therefore, of the present invention is to provide a more improved steel plate having an organic coating which not only attains the above-mentioned first object of the present invention but also successfully solves the problems involved in the chromate treating such as chromium dissolution and deterioration in waterproofing secondary adhesion.

In one aspect, the present invention attains its first object by a steel plate with organic coating having improved corrosion resistance that comprises a zinc or zinc alloy plated steel plate having on its surface a chromate film deposited in an amount of 5-500 mg/m$^2$ in terms of metallic chromium, said chromate film being overlaid with a solid film that is deposited in an amount of 0.1-4.0 g/m$^2$ and that is formed of a paint composition that consists of 100 parts by weight of a modified epoxy resin having 0.8-1.0 mole of a dialkanolamine added per equivalent of epoxy groups in an epichlorohydrin-disphenol A type epoxy resin having 500-5,000 epoxy equivalents, 0.5-10 parts by weight of a silane coupling agent, 5-70 parts by weight of an amino resin, and 10-150 parts by weight of silica.

In another aspect, the present invention attains its second object by a steel plate with organic coating having improved corrosion resistance that comprises a steel plate at least one side of which is plated with zinc or a zinc alloy and thereafter coated with a chromate solution that is deposited in an amount of 5-500 mg/m$^2$ in terms of metallic chromium, that has a molar ratio of trivalent chromium to total chromium ($Cr^{3+}$/T-Cr) in the range of 0.05-0.7 and that contains zinc oxide in such an amount that the molar ratio of total chromium to zinc oxide (T-Cr/ZnO) is in the range of 4-25, the applied chromate solution being thereafter baked and overlaid with a solid film that is deposited in an amount of 0.1-4.0 g/m² and that is formed of a paint composition that consists of 100 parts by weight of a modified epoxy resin having 0.8-1.0 mole of a dialkanolamine added per equivalent of epoxy groups in an epichlorohydrin-bisphenol A type epoxy resin having 500-5,000 epoxy equivalents, 0.5-10 parts by weight of a silane coupling agent, 5-70 parts by weight of an amino resin, and 10-150 parts by weight on a solids basis of silica.

In still another aspect, the present invention attains its third object by a steel plate with organic coating having improved corrosion resistance that comprises a steel plate at least one side of which is plated with zinc or a zinc alloy and thereafter coated with a chromate solution that is deposited in an amount of 5-500 mg/m² in terms of metallic chromium, that has a molar ratio of trivalent chromium to total chromium ($Cr^{3+}$/T-Cr) in the range of 0.05-0.7, that contains zinc oxide in such an amount that the molar ratio of total chromium to zinc oxide (T-Cr/ZnO) is in the range of 4-25, and that further contains a silica sol in an amount of 50-300% of total chromium, the applied chromate solution being thereafter baked and overlaid with a solid film that is deposited in an amount of 0.1-4.0 g/m² and that is formed of a paint composition that consists of 100 parts by weight of a modified epoxy resin having 0.8-1.0 mole of a dialkanolamine added per equivalent of epoxy groups in an epichlorohydrin-bisphenol A type epoxy resin having 500-5,000 epoxy equivalents, 0.5-10 parts by weight of a silane coupling agent, 5-70 parts by weight of an amino resin, and 10-150 parts by weight on a solids basis of silica.

In each of the aspects described above, the amino resin is preferably at least one member selected from the group consisting of a benzoguanamine resin, a melamine resin and a urea-formaldehyde resin. In the first aspect, it is particularly preferred to use a benzoguanamine resin as the amino resin.

In the first aspect, the chromate film is preferably deposited in an amount of 10-200 mg/m² in terms of metallic chromium, and in the second and third aspects, the chromate solution is preferably coated and baked in an amount of 10-200 mg/m² in terms of metallic chromium.

In each of the three aspects described above, the silane coupling agent is preferably incorporated in an amount of 1-5 parts by weight per 100 parts by weight of the modified epoxy resin.

It is also preferred that the amino resin is incorporated in an amount of 10-40 parts by weight per 100 parts by weight of the modified epoxy resin.

In another preferred embodiment, the solid film of paint composition is deposited in an amount of 0.3-2.0 g/m².

In still another preferred embodiment, the dialkanolamine is at least one member selected from the group consisting of diethanolamine, dipropanolamine and dibutanolamine.

In yet another preferred embodiment, the silane coupling agent is represented by the following general formula (I):

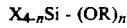

$$X_{4-n}Si\text{-}(OR)_n \qquad (I)$$

where n is an integer of 1-3; X is at least one functional group selected from the group consisting of a vinyl group, a mercapto group, an epoxy group and a chloride group; and OR is at least one group selected from the group consisting of a methoxy group and an ethoxy group.

In each of the three aspects of the present invention, a dialkanolamine is introduced into the highly adherent skeleton of bisphenol A and the interaction between the dialkanolamine and silica provides a sufficient film reinforcing effect to produce an organic coating that insures satisfactory alkali resistance even if it is not completely crosslinked. In other words, even if it is baked by low-temperature, rapid heating, the organic resin coating can safely be subjected to cationic electrodeposition without dissolving out or becoming soft upon swelling under the action of the alkali that is generated at the interface between the electrodeposited film and the resin coating. Hence, the organic coating on the steel plate of the present invention insures good paint adhesion.

The second and third aspects of the present invention are particularly advantageous in that not only does the organic coating exhibit improved corrosion resistance and paint adhesion but also the underlying chromate layer has chromium immobilized by a sufficient degree to resist dissolution.

DETAILED DESCRIPTION OF THE INVENTION

The present invention is described below in detail.

The steel plate used in the present invention may be plated with various metals by various methods, including electro zinc plating, zinc hot dipping, electro zinc alloy plating (e.g. Zn-Ni, Zn-Fe, Zn-Al or Zn-Mn), plating with alloyed molten zinc, plating with molten zinc alloys (e.g. Zn-Al, Zn-Fe or Zn-Mg), aluminum hot dipping, and dispersive plating. If desired, different metals or alloys may be plated in multiple layers.

The surface of this plated steel plate is chromated in order to provide improved adhesion to an organic coating to be subsequently applied and hence to improve its corrosion resistance. The chromate film is suitably deposited in an amount of 5-500 mg/m² in terms of metallic chromium. Below 5 mg/m², not only corrosion resistance but also the adhesion to a later formed organic coating is insufficient. Above 500 mg/m², workability and weldability will be impaired. A deposit of 10-200 mg/m² is preferred since even better corrosion resistance and weldability can be provided.

If special considerations need not given to prevent chromium dissolution from the chromate layer and to improve waterproofing secondary adhesion, the chromate treatment may be performed by any known technique such as a reactive method, a coating method or an electrolytic method. However, if the steel plate of the present invention is to be used under such conditions that chromium dissolution or deterioration in waterproofing secondary adhesion should never occur, the chromate film is advantageously formed as in the second and third aspects of the present invention.

In the second aspect, a chromating solution that has a trivalent to total chromium molar ratio ($Cr^{3+}$/T-Cr) of 0.05-0.7 and which contains zinc oxide in such an amount that the molar ratio of total chromium to zinc oxide (T-Cr/ZnO) is in the range of 4-25 is applied to the steel plate and baked. If the trivalent chromium to total chromium molar ratio ($Cr^{3+}$/T-Cr) is less than 0.05, the water-soluble $Cr^{6+}$ in present is an excess amount in the chromate film and the amount of chromium dissolution will dramatically increase. If the trivalent chromium to total chromium molar ratio ($Cr^{3+}$/T-Cr) exceeds 0.7, the amount of chromium dissolution will decrease but on the other hand, the corrosion resistance of the chromate film will deteriorate. In addition, the chromating solution will lose its stability and is not suitable for use in manufacture since it gels to solidify like pudding in the course of time.

The addition of zinc oxide is effective for the purpose of decreasing the amount of chromium dissolution without sacrificing corrosion resistance. The exact mechanism for the ability of zinc oxide to provide improved resistance to chromium dissolution is not clear but the following explanation may be postulated. Chromium dissolves out in the form of $C^{6+}$ but it dissolves in water in the form of $CrO_4^{2-}$. The isoelectric point of ZnO is at a pH of 9.3–10.3 and below pH 9, the surface of ZnO is positively charged and attracts $CrO_4^{2-}$ electrostatically to insure that it will not dissolve out of the chromate film.

If the molar ratio of total chromium to zinc oxide (T-Cr/ZnO) is less than 4, the pH of the chromating solution increases on account of the excess ZnO and the solution will lose its stability and becomes no longer suitable for use in manufacture since it will gel to solidify like pudding in the course of time. If the molar ratio of total chromium to zinc oxide (T-Cr/ZnO) exceeds 25, the amount of ZnO that attracts $CrO_4^{2-}$ electrostatically is insufficient to achieve satisfactory improvement in resistance to chromium dissolution.

Thus, in the second aspect of the present invention, not only is the molar ratio of $Cr^{3+}$/T-Cr in the chromating solution adjusted to lie within the appropriate range but also ZnO is incorporated in the specified amount in the chromate film to insure that said chromate film has satisfactory resistance to chromium dissolution and high waterproofing secondary adhesion. If desired, other additives may be incorporated in the chromate film to the extent that will not impair the purposes of the present invention.

Thus, in the third aspect of the present invention, a silica sol is additionally incorporated in the chromate film to further improve its corrosion resistance. The silica sol is preferably added in an amount of 50–300% of the total chromium in the chromate film.

The mechanism by which silica improves the corrosion resistance of the chromate film may be explained as follows. The hydrated oxide of chromium is positively charged and said to have selective anion permeability (not permeable to cations). On the other hand, the surface of silica is negatively charged at a pH of 3–11. Thus, the incorporation of silica into the chromate film will probably result in the loss of its anion permeability and it will instead acquire selective cation permeability. In other words, $OH^-$ that is formed on the surface of the substrate plate as a result of cathodic reaction will not easily penetrate through the chromate film to thereby prevent the occurrence of progressive cathodic reaction.

If the silica sol is present in an amount less than 50% of the total chromium in the chromating solution, it is ineffective in further improving the corrosion resistance of the chromate film. If the silica sol is present in an amount exceeding 300% of the total chromium in the chromating solution, part of the silica in the chromating solution will precipitate to impair the uniform applicability of the chromate film.

If desired, still other additives such as phosphoric acid and organic acids may be incorporated in the chromating solution to the extent that will not impair the objects of the present invention.

In each of the three aspects of the present invention, an organic high-molecular weight resin film is formed on top of the chromate film and optimum conditions for the formation of this film are described below.

The epoxy resin having 500–5,000 epoxy equivalents which is to be used in the present invention is preferably based on the condensation product of bisphenol A and epichlorohydrin. Epoxy resins solely composed of an aliphatic epoxy or an alicyclic epoxy structure may be used but in order to attain high corrosion resistance, epoxy resins chiefly composed of the condensation product of bisphenol A and epichlorohydrin are preferably used. Such epoxy resins are commercially available under such trade names as Epikote 1010, 1009, 1007, 1004 and 1001 (all being products of Shell Chemical Co.).

The epoxy resin to be used in the present invention must have epoxy equivalents within the range of 500–5,000. If the epoxy resin has less than 500 epoxy equivalents, the molecular weight of the resin unavoidably becomes too low to insure satisfactory alkali resistance and strong paint adhesion will not be attained after electrodeposition. If the epoxy resin has more than 5,000 epoxy equivalents, the amount of dialkanolamine to be added to epoxy groups is so small that neither the intended film reinforcing effect to be achievable by interaction with silica nor the desired curability at low temperatures that should be provided by combination with amino resins (which is to be described hereinafter) can be obtained to the fullest extent and strong paint adhesion will not be attained after electrodeposition.

The dialkanolamine is suitably added to the epichlorohydrin-bisphenol A type epoxy resin in an amount of 0.8–1.0 mole per equivalent of epoxy groups. If the amount of dialkanolamine added is less than 0.8 moles per equivalent of epoxy groups, neither the desired curability at low temperatures that should be provided by combination with amino resins nor the intended film reinforcing effect to be achievable by interaction with silica can be obtained, so that the organic resin film will swell on account of the highly basic alkali that is generated during electrodepositioin at the interface with the resin film and the overlying electrodeposited film, and this causes deterioration in the adhesion between the two films. If the dialkanolamine is added in an amount exceeding 1.0 mole per equivalent of epoxy groups, there occurs excess dialkanolamine which is not added to epoxy group and that will not take part in combining with silica to provide a film reinforcing effect. Such excess dialkanolamine is not only uneconomical but it also remains unreacted in the resin film to deteriorate such factors as corrosion resistance and waterproofing secondary adhesion.

The composite resin described above can be obtained by adding the dialkanolamine to the epoxy resin having 500–5,000 epoxy resins and then subjecting the mixture to reaction at a temperature in the range of from room temperature to 100° C. for a period ranging from 3 to 5 hours. Examples of the dialkanolamine include diethanolamine, dipropanolmaine, dibutanolamine, etc. Dialkanolamine has the advantage that it is capable of introducing a greater amount of primary hydroxyl groups and this contributes to an enhancement of the film reinforcing effect that is achieved by combination with silica, thus leading to a further improvement in curability at low temperatures.

It is also necessary for the purposes of the present invention that the composite resin described contain a silane coupling agent and an amino resin as two other essential ingredients. The silane coupling agent serve as a crosslinking agent by entering into a dehydrative condensation reaction with the hydroxyl groups in the composite resin. Further, it enhances the adhesion to the underlying chromate film, thereby providing a stronger bond between the chromate film and the resin layer. Because of these effect, the silane coupling agent contributes to an improvement in the overall adhesion of coated films.

The silane coupling agent will prove particularly effective with resins of the type used in the present invention that have terminal primary hydroxyl groups. The silane coupling agent is inherently used to enhance the formation of an effective composite between the resin and silica. The resin used in the present invention has terminal primary hydroxyl groups and is highly reactive with the silane coupling agent. As a result, the formation of an effective composite between the resin and silica is further enhanced to achieve substantial improvement in corrosion resistance.

The present inventors conducted intensive studies on the silane coupling agent that would be suitable for incorporation in the epoxy resin composition and found as a result that a silane coupling agent having the molecular structure shown below had good miscibility with the other ingredients of the paint, remained stable in the paint, and produced a stronger bond between the chromate film and the resin film, to thereby improve the adhesion between these films.

The silane coupling agent used in the present invention preferably has the following general formula (I):

$$X_{4-n}Si - (OR)_n \qquad (I)$$

where n is an integer of 0–4; X is a functional group capable of reacting with an organic material; and OR is a hydrolyzable group such as methoxy or ethoxy. Preferred examples of X include vinyl, mercapto group, an epoxy group and a chloride group. A coupling agent containing an amino group as X is not suitable for use since it will cause an undue increase in the viscosity of the paint.

Commonly employed silane coupling agents include epoxysilanes, aminosilanes, vinylsilanes and mercaptosilanes but aminosilanes are not suitable for use in the present invention since they are poorly miscible with the resin to be used in the present invention. Specific examples of the coupling agents that can be used in the present invention are listed below: exemplary epoxysilanes include β-(3,4-epoxycyclohexyl) ethyltrimethoxysilane and γ-glycidoxypropyltrimethoxysilane; illustrative vinylsilanes include vinyltriethoxysilane, vinyltris (2-methoxyethoxy) silane and γ-methacryloxypropyltrimethoxysilane; and exemplary mercaptosilanes include γ-mercaptopropyltrimethoxysilane.

The silane coupling agent is used as an additive that is to be incorporated into the composite resin described above. It is preferably added in an amount of 0.5–10 parts by weight, more preferably 1–5 parts by weight, per 100 parts by weight of the solids content of the composite resin. If the coupling agent is used in an amount less than 0.5 parts by weight per 100 parts by weight of the solids content of the composite resin, the effectiveness of the agent is not fully exhibited and the bond between the resin film and the chromate film is insufficient to provide improved adhesion between the films. If the amount of the coupling agent used exceeds 10 parts by weight per 100 parts by weight of the solids content of the composite resin, part of the agent may remain unreacted to cause poor adhesion between the resin film and the chromate film.

It is also essential for the purposes of the present invention that an amino resin be incorporated in the composite resin. The amino resin also works as a crosslinking agent by entering into a dehydrative condensation reaction with hydroxyl groups in the composite resin and it helps form a stronger and denser film that has high water and alkali resistance. Examples of the amino resin that can be used in the present invention to attain these effects include known amino resins that are modified with methanol or butanol, such as the polycondensation product of urae and formaldehyde, monomeric or polymeric melamine resins, benzoguanamine resins, etc.

The crosslinking agents described above have the advantage that when combined with the modified epoxy resin, they provide a resin composition that can be effectively cured even if it is rapidly heated at low temperatures.

A benzoguanamine resin is particularly preferred as an amino resin to be used as a crosslinking agent. A small amount of benzoguanamine will also remain unreacted in the resin film after curing at low temperatures but the resin film retains good adhesion to the chromate film since benzoguamine has highly alkali-resistant benzene and triazine rings in its skeleton. However, if amino resins other than benzoguanamine remain unreacted in the cured resin film even in a small amount, the unreacted portion may sometimes reduce the alkali resistance of the film. Therefore, the use of benzoguanamine as a crosslinking agent is particularly preferred if the applied resin film is to be cured by low-temperature, rapid heating where the presence of an unreacted portion of the crosslinking agent is unavoidable.

The amino resin is incorporated in the composite resin in an amount of 5–70 parts by weight, preferably 10–40 parts by weight, per 100 parts by weight of the solids content of the composite resin. If the content of the amino resin is less than 5 parts by weight per 100 parts by weight of the solids content of the composite resin, the latter will not cure to an extent that is satisfactory for the purposes of the present invention. If the content of the amino resin exceeds 70 parts by weight per 100 parts by weight of the solids content of the composite resin, part of the amino resin can remain unreacted if the applied composite resin film is baked at low temperatures and this unreacted portion will impair the adhesion of the resin film to the chromate film.

In the present invention, the corrosion resistance of the resin film formed of the composition consisting of the composite resin and the amino resin is further improved by incorporating silica in said resin composition. Silica is incorporated in an amount, on a solids basis, of 10–150 parts by weight, preferably 20–100 parts by weight, per 100 parts by weight, on a solids basis, of the base resin (modified epoxy resin). If the silica content is less than 10 parts by weight per 100 parts by weight of the base resin, the desired improvement in corrosion resistance is not achievable. If the silica content exceeds 150 parts by weight per 100 parts by weight of the base resin, the adhesion to a second coat (intermediate coat)

and the workability of the coated steel plate will plate will deteriorate. The silica to be incorporated in the resin composition may be either colloidal silica or fumed silica.

The resin composition having the formula described above may be applied to the top surface of the chromate film on the galvanized or otherwise plated steel plate by any suitable coating method such as roll coating, spray coating or shower coating. For drying and curing purposes, the steel plate need only be heated at a temperature of 100°–200° C. A particular advantage of the present invention is that the applied resin composition can be adequately cured simply by heating at 150° C. or below, so even a bake hardenable steel plate can be used as a substrate without the risk of sacrificing its bake hardenability.

The resin composition must be applied in such a dry thickness that it is deposited as a solid film in an amount of 0.1–4.0 g/m². If the resin deposit if less than 0.1 g/m², satisfactory protection against corrosion is not insured. If the resin deposit exceeds 4.0 g/m², it cannot be expected that good appearance after electrodeposition and satisfactory spot weldability will be obtained in a consistent way. The preferred resin deposit is within the range of 0.3–2.0 g/m² since further improvement in spot weldability can be achieved.

As described in detail on the foregoing pages, the steel plate of the present invention has an organic coating formed of a resin composition that comprises an epoxy resin, a dialkanolamine, an amino resin and silica in specified proportions. The dialkanolamine added to epoxy groups in the epoxy resin combines with the amino resin to provide a resin film that can be cured effectively at low temperatures. Further, the dialkanolamine combines with the silica to provide a satisfactory film reinforcing effect. The organic coating formed of this resin composition can be effectively cured by rapid heating at low temperatures not higher than 150° C., and even if it is later subjected to cationic electrodeposition, the resin film will neither dissolve nor soften upon swelling under the action of the alkali that is generated during electrodeposition at the interface between the electrodeposited film and the resin film. Therefore, the organic coating on the steel plate of the present invention has good electrodeposition quality, strong adhesion between coated films and satisfactory corrosion resistance. Further, the organic coating on the steel plate of the present invention can be so designed that it exhibits satisfactory resistance to Cr dissolution, paint adhesion and corrosion resistance even if it is cured by low-temperature, rapid heating. Because of these advantages, the steel plate with organic coating of the present invention can successfully be painted and used as automotive parts.

EXAMPLES

The following examples are provided for the purpose of further illustrating the present invention but are in no way to be taken as limiting.

Example 1

A reactor equipped with a reflux condenser, a stirrer, a thermometer and a nitrogen gas blowing pipe was charged with 3,000 g of (corresponding to one equivalent of epoxy groups) of Epikote 1009 (Epoxy resin of Shell Chemical Co. with 3,000 epoxy equivalents) and 1,000 g of toluene. The charge was heated to 80° C. to form a uniform solution. Diethanolamine (105 g) was added dropwise to the solution over a period of 1 h and the mixture was subjected to reaction at 80° C. for 3 h. The reaction was found to have ceased when the extinction of epoxy groups was verified by chemical analysis.

To 100 parts by weight (on a solids basis) of the thus obtained modified epoxy resin, $\gamma$-glycidoxypropyltrimethoxysilane ("A-187", the trade name of a silane coupling agent produced by Nippon Unicar Co., Ltd.), benzoguanamine and colloidal silica dispersed in an organic solvent were added and the ingredients were mixed to prepare a coating solution.

This coating solution was applied by bar coating onto a degreased and chromated (T-Cr=50 mg/m²) Zn-Ni plated steel plate (Ni content=12%; plate deposit=20 g/m²) and the applied coating was baked to form a solid film having an average resin deposit of 1.0 g/m2. The baking conditions were such that the plate was heated to a final temperature of 150° C. within 30 sec. The thus fabricated steel plate with an organic coating was designated sample No. 101 of the present invention.

Additional sample Nos. 102–130 were fabricated by changing the process conditions as shown in Table 1.

Comparative sample Nos. 131–143 were also fabricated by employing the process conditions outside the scope of the present invention as shown in Table 1.

Notes *1 to *9 to Table 1 mean as follows:

*1: Type of chromating treatment (1) Coating

Bath composition: $Cr^{3+}$/T-Cr=0.6. pH=1–1.9.

(2) Electrolysis

Bath composition: known electrolytic chromating solution (e.g. $Cr^{3+}$/T-Cr$\leq$0.1; pH, 1–2).

Conditions: 15 A/dm²$\times$5 sec.

*2: Base epoxy resin

| No. | Trade name | Manufacturer |
| --- | --- | --- |
| 1 | Epikote 1001 | Shell Chemical Co. |
| 2 | Epikote 1004 | " |
| 3 | Epikote 1007 | " |
| 4 | Epikote 1009 | " |
| 5 | Epikote 1010 | " |
| 6 | Epikote 834 | " |
| 7 | EPICLON EXA-123 | Dainippon Ink & Chemicals, Inc. |

*3: Dialkanolamine

1. Diethanolamine
2. Dipropanolamine
3 Dibutanolamine

*4: No. of moles of dialkanolamine per equivalent of epoxy groups

*5: Silane coupling agent

| No. | Compound and Trade name | Manufacturer |
| --- | --- | --- |
| 1 | $\beta$-(3,4-epoxycyclohexyl)ethyl-trimethoxysilane, A-186 | Nippon Unicar Co., Ltd. |
| 2 | $\gamma$-glycidoxypropyltrimethoxysilane, A-187 | Nippon Unicar Co., Ltd. |
| 3 | vinyltriethoxysilance, A-151 | Nippon Unicar Co., Ltd. |
| 4 | $\gamma$-mercaptopropyltrimethoxysilane, A-189 | Nippon Unicar Co., Ltd. |

*6 Parts by weight of silane coupling agent incorporated in 100 parts by weight (on a solids basis) of dialkanolamine added epoxy resin

*7: Parts by weight (on a solids basis) of benzoguanamine incorporated in 100 parts by weight (on a solids basis) of dialkanolamine added epoxy resin

*8: Silica
1. Colloidal silica dispersed in organic solvent.
2. Hydrophobic super-fine particulate silica.

*9: Parts by weight (on a solids basis) of silica added to 100 parts by weight (on a solids basis) of dialkanolamine added epoxy resin.

The appearance of the steel plate samples after electrodeposition, the film adhesion after application of a second coat, the corrosion resistance of blank before electrodeposition, and their workability and weldability were evaluated by the following methods.

Appearance after electrodeposition

Power Top U-100 (Nippon Paint Co., Ltd.) was electrodeposited in a thickness of 20 μm on each test sample at 100 volts for 3 min at 28° C. The appearance of the electrodeposited coat was evaluated by the following criteria:

| Gas pinholes: | ◯, 0–6 pinholes/cm$^2$; |
| | Δ, 7–10 pinholes/cm$^2$; |
| | X, >10 pinholes/cm$^2$ |
| Orange peel: | ⊙, smooth surface; ◯, slight; Δ, moderate; |
| | X, extensive |

Film adhesion after application of a second coat

The samples with an electrodeposited coat were spray-coated with Neoamilac B002 White (Kansai Paint Co., Ltd.) to form a second coat in a thickness of 30 μm. Thereafter, the samples were subjected to a waterproofing secondary adhesion test by the following procedure: the samples were immersed in hot pure water (40° C.) for 240 h; within 30 min after recovery from the water, 100 cross cuts 1 mm apart were formed through the second coat and an adhesive tape was applied over the cross-hatched area; the tape was quickly pulled off and the number of squares that were pulled off was counted. The results were evaluated by the following criteria: ⊙, 0/100; ◯, ≦1/100; Δ, 2–10/100; X, ≧11/100.

Corrosion resiatance

The samples were subjected to a cycle corrosion test (CCT) in which one cycle consisted of spraying with 5 wt % NaCl at 35° C. for 4 h, drying at 60° C. for 2 h, and leaving in a hot and humid atmosphere (50° C.×95% r.h.) for 2 h. The coverage by red rust after 100 cycles was evaluated by the following criteria: ⊙, none; ◯, <10%, Δ, 10–50%; X, ≧50%.

Workability

Each of the blank samples (90 mm$^\phi$) was drawn to form a cylinder (50mm$^\phi$ × 25 mm$^D$) with a blank holder force of 1 ton. An adhesive tape was applied onto the worked area and quickly pulled off. The amount of the resin coat that was pulled off was measured in milligrams per circumference and the results were evaluated by the following criteria: ⊙, <1 mg; ◯, 1 to less than 2 mg; Δ, 2–5 mg; X, >5 mg.

Weldability

Two specimens of each sample were lapped with the resin coats facing each other and spot welding was performed with electrodes having a dome-type face (40 mm$^R$) at a clamping pressure of 170 kg for a weld time of 10 cycles (50 cycles/sec). The number of spot welds that could be made without interruption was counted.

TABLE 1-1

| | Substrate plate | | Chromate film | | Resin film | | | | | | | |
|---|---|---|---|---|---|---|---|---|---|---|---|---|
| | | Plate | | Chromium | Base epoxy resin | | Dialkanolamine *4 | | Silane coupling agent *6 | | Benzoguanamine *7 | Silica *9 |
| Sample No.* | Plate type | deposit, g/m$^2$ | *1 Type | deposit, mg/m$^2$ | *2 Type | Epoxy equivalent | *3 Type | No. of moles | *5 Type | Parts by weight | Parts by weight | *8 Type | Parts by weight |
| 101 | Zn—Ni | 20 | Coating | 50 | 4 | 3000 | 1 | 1.0 | 1 | 3 | 40 | 1 | 50 |
| 102 | Zn—Ni | 20 | Coating | 50 | 4 | 3000 | 1 | 1.0 | 1 | 1 | 40 | 1 | 50 |
| 103 | Zn—Ni | 20 | Coating | 50 | 4 | 3000 | 1 | 1.0 | 1 | 9 | 40 | 1 | 50 |
| 104 | Zn—Ni | 20 | Coating | 50 | 4 | 3000 | 1 | 0.8 | 1 | 2 | 40 | 1 | 50 |
| 105 | Zn—Ni | 20 | Coating | 50 | 4 | 3000 | 1 | 0.9 | 2 | 3 | 10 | 1 | 50 |
| 106 | Zn—Ni | 20 | Coating | 50 | 4 | 3000 | 1 | 1.0 | 2 | 0.5 | 60 | 1 | 50 |
| 107 | Zn—Ni | 20 | Coating | 50 | 4 | 3000 | 2 | 0.8 | 2 | 3 | 40 | 1 | 150 |
| 108 | Zn—Ni | 20 | Coating | 50 | 4 | 3000 | 3 | 0.9 | 2 | 3 | 40 | 1 | 20 |
| 109 | Zn—Ni | 20 | Coating | 50 | 3 | 2000 | 1 | 1.0 | 1 | 3 | 40 | 1 | 50 |
| 110 | Zn—Ni | 20 | Coating | 50 | 3 | 2000 | 2 | 0.8 | 3 | 2 | 40 | 1 | 50 |
| 111 | Zn—Ni | 20 | Coating | 50 | 3 | 2000 | 3 | 1.0 | 4 | 1 | 40 | 1 | 50 |
| 112 | Zn—Ni | 20 | Coating | 50 | 2 | 1000 | 1 | 0.9 | 2 | 2 | 40 | 1 | 50 |
| 113 | Zn—Ni | 20 | Coating | 100 | 2 | 1000 | 1 | 0.8 | 2 | 3 | 40 | 1 | 50 |
| 114 | Zn—Ni | 20 | Coating | 200 | 2 | 1000 | 1 | 1.0 | 1 | 3 | 40 | 2 | 50 |
| 115 | Zn—Ni | 20 | Coating | 50 | 2 | 1000 | 2 | 1.0 | 1 | 2 | 40 | 2 | 50 |
| 116 | Zn—Ni | 20 | Coating | 50 | 2 | 1000 | 2 | 1.0 | 1 | 6 | 40 | 2 | 50 |
| 117 | Zn—Ni | 20 | Coating | 50 | 5 | 5000 | 2 | 1.0 | 1 | 1 | 40 | 2 | 50 |
| 118 | Zn—Ni | 20 | Coating | 50 | 5 | 5000 | 2 | 1.0 | 1 | 0.8 | 20 | 2 | 50 |
| 119 | Zn—Ni | 20 | Coating | 50 | 5 | 5000 | 3 | 0.9 | 4 | 2 | 20 | 2 | 50 |
| 120 | Zn—Ni | 20 | Coating | 50 | 5 | 5000 | 3 | 0.9 | 2 | 5 | 20 | 2 | 100 |
| 121 | Zn—Ni | 20 | Coating | 50 | 1 | 500 | 3 | 0.9 | 1 | 1 | 70 | 2 | 50 |
| 122 | Zn—Ni | 20 | Coating | 50 | 1 | 500 | 1 | 1.0 | 3 | 3 | 40 | 1 | 50 |
| 123 | Zn—Ni | 20 | Coating | 50 | 1 | 500 | 1 | 1.0 | 2 | 3 | 40 | 1 | 50 |
| 124 | Zn—Ni | 20 | Coating | 50 | 1 | 500 | 1 | 0.8 | 1 | 3 | 40 | 1 | 50 |
| 125 | Zn—Ni | 20 | Coating | 50 | 1 | 500 | 2 | 0.8 | 1 | 3 | 40 | 1 | 50 |
| 126 | Zn—Ni | 20 | Coating | 50 | 4 | 3000 | 2 | 1.0 | 2 | 1 | 40 | 2 | 50 |
| 127 | Zn—Ni | 20 | Coating | 50 | 4 | 3000 | 2 | 1.0 | 2 | 2 | 40 | 2 | 50 |

TABLE 1-1-continued

| | | | | | | | | | | | | |
|---|---|---|---|---|---|---|---|---|---|---|---|---|
| 128 | Zn—Fe | 20 | Coating | 50 | 4 | 3000 | 1 | | 2 | 4 | 40 | 2 | 50 |
| 129 | Zn—Mn | 20 | Coating | 50 | 4 | 3000 | 1 | 1... | 2 | 3 | 40 | 2 | 70 |
| 130 | Zn—Ni | 20 | Electro deposition | 50 | 4 | 3000 | 1 | 1.0 | 1 | 3 | 40 | 2 | 70 |

| | Resin film | | Cation electrodeposition quality (Power top U-100) | | | | | | |
|---|---|---|---|---|---|---|---|---|---|
| | | Baking | Appearance | | Adhesion | | | | |
| Sample No.* | Resin deposit, g/m² | temperature, °C. | Gas pinhole | Orange Peel | Primary | Secondary | Corrosion resistance | Workability | Weldability |
| 101 | 1.0 | 150 | ○ | ⊙ | ⊙ | ⊙ | ⊙ | ⊙ | >1000 |
| 102 | 1.0 | 150 | ○ | ⊙ | ⊙ | ⊙ | ⊙ | ⊙ | >1000 |
| 103 | 1.0 | 150 | ○ | ⊙ | ⊙ | ⊙ | ⊙ | ⊙ | >1000 |
| 104 | 1.0 | 150 | ○ | ⊙ | ⊙ | ⊙ | ⊙ | ⊙ | >1000 |
| 105 | 1.0 | 150 | ○ | ⊙ | ⊙ | ⊙ | ⊙ | ⊙ | >1000 |
| 106 | 1.0 | 150 | ○ | ⊙ | ⊙ | ⊙ | ⊙ | ⊙ | >1000 |
| 107 | 1.0 | 150 | ○ | ⊙ | ⊙ | ⊙ | ⊙ | ⊙ | >1000 |
| 108 | 1.0 | 150 | ○ | ⊙ | ⊙ | ⊙ | ⊙ | ⊙ | >1000 |
| 109 | 0.3 | 150 | ○ | ⊙ | ⊙ | ⊙ | ⊙ | ⊙ | >1000 |
| 110 | 3.0 | 150 | ○ | ⊙ | ⊙ | ⊙ | ⊙ | ⊙ | >1000 |
| 111 | 3.0 | 200 | ○ | ⊙ | ⊙ | ⊙ | ⊙ | ⊙ | >1000 |
| 112 | 3.0 | 100 | ○ | ⊙ | ⊙ | ⊙ | ⊙ | ⊙ | >1000 |
| 113 | 3.0 | 150 | ○ | ⊙ | ⊙ | ⊙ | ⊙ | ⊙ | >1000 |
| 114 | 3.0 | 150 | ○ | ⊙ | ⊙ | ⊙ | ⊙ | ⊙ | >1000 |
| 115 | 1.0 | 150 | ○ | ⊙ | ⊙ | ⊙ | ⊙ | ⊙ | >1000 |
| 116 | 1.0 | 150 | ○ | ⊙ | ⊙ | ⊙ | ⊙ | ⊙ | >1000 |
| 117 | 1.0 | 150 | ○ | ⊙ | ⊙ | ⊙ | ⊙ | ⊙ | >1000 |
| 118 | 1.5 | 150 | ○ | ⊙ | ⊙ | ⊙ | ⊙ | ⊙ | >1000 |
| 119 | 1.5 | 150 | ○ | ⊙ | ⊙ | ⊙ | ⊙ | ⊙ | >1000 |
| 120 | 1.5 | 150 | ○ | ⊙ | ⊙ | ⊙ | ⊙ | ⊙ | >1000 |
| 121 | 0.8 | 150 | ○ | ⊙ | ⊙ | ⊙ | ⊙ | ⊙ | >1000 |
| 122 | 0.8 | 150 | ○ | ⊙ | ⊙ | ⊙ | ⊙ | ⊙ | >1000 |
| 123 | 0.8 | 150 | ○ | ⊙ | ⊙ | ⊙ | ⊙ | ⊙ | >1000 |
| 124 | 1.0 | 150 | ○ | ⊙ | ⊙ | ⊙ | ⊙ | ⊙ | >1000 |
| 125 | 1.0 | 150 | ○ | ⊙ | ⊙ | ⊙ | ⊙ | ⊙ | >1000 |
| 126 | 1.0 | 150 | ○ | ⊙ | ⊙ | ⊙ | ⊙ | ⊙ | >1000 |
| 127 | 1.0 | 150 | ○ | ⊙ | ⊙ | ⊙ | ⊙ | ⊙ | >1000 |
| 128 | 1.0 | 150 | ○ | ⊙ | ⊙ | ⊙ | ⊙ | ⊙ | >1000 |
| 129 | 1.0 | 150 | ○ | ⊙ | ⊙ | ⊙ | ⊙ | ⊙ | >1000 |
| 130 | 1.0 | 150 | ○ | ⊙ | ⊙ | ⊙ | ⊙ | ⊙ | >1000 |

*Sample Nos. 101-130 were all within the scope of the invention.

TABLE 1-2

| | Substrate plate | | Chromate film | | Resin film | | | | | | | |
|---|---|---|---|---|---|---|---|---|---|---|---|---|
| | | Plate | | Chromium | Base epoxy resin | | Dialkanolamine | | Silane coupling agent | | Benzoguanamine *7 | Silica *9 | |
| Sample No.* | Plate type | deposit, g/m² | *1 Type | deposit, mg/m² | *2 Type | Epoxy equivalent | *3 Type | *4 No. of moles | *5 Type | *6 Parts by weight | Parts by weight | *8 Type | Parts by weight |
| 131 | Zn—Ni | 20 | Coating | 50 | 6 | 250 | 1 | 1.0 | 1 | 3 | 40 | 1 | 50 |
| 132 | Zn—Ni | 20 | Coating | 50 | 7 | >5000 | 1 | 1.0 | 1 | 3 | 40 | 1 | 50 |
| 133 | Zn—Ni | 20 | Coating | 50 | 3 | 2000 | 1 | 0.3 | 1 | 3 | 40 | 1 | 50 |
| 134 | Zn—Ni | 20 | Coating | 50 | 3 | 2000 | 2 | 0.8 | 2 | 0.1 | 40 | 1 | 50 |
| 135 | Zn—Ni | 20 | Coating | 50 | 3 | 2000 | 2 | 1.0 | 2 | 15 | 40 | 1 | 50 |
| 136 | Zn—Ni | 20 | Coating | 50 | 3 | 2000 | 1 | 1.0 | 1 | 3 | 100 | 1 | 50 |
| 137 | Zn—Ni | 20 | Coating | 50 | 3 | 2000 | 1 | 1.0 | 1 | 3 | 2 | 1 | 50 |
| 138 | Zn—Ni | 20 | Coating | 50 | 3 | 2000 | 1 | 0.8 | 1 | 3 | 40 | 1 | 200 |
| 139 | Zn—Ni | 20 | Coating | 50 | 3 | 2000 | 1 | 0.8 | 1 | 3 | 40 | 1 | 5 |
| 140 | Zn—Fe | 40 | Coating | 50 | 3 | 2000 | 1 | 1.0 | 1 | 3 | 40 | 1 | 50 |
| 141 | Zn—Mn | 20 | Coating | 3 | 3 | 2000 | 1 | 1.0 | 1 | 3 | 40 | 1 | 50 |
| 142 | Zn—Ni | 20 | Electro deposition | 600 | 3 | 2000 | 2 | 1.0 | 1 | 3 | 40 | 1 | 50 |
| 143 | Zn—Ni | 20 | Coating | 50 | 3 | 2000 | 1 | 2.0 | 1 | 3 | 40 | 1 | 50 |

| | Resin film | | Cation electrodeposition quality (Power top U-100) | | | | | | |
|---|---|---|---|---|---|---|---|---|---|
| | | Baking | Appearance | | Adhesion | | | | |
| Sample No.* | Resin deposit, g/m² | temperature, °C. | Gas pinhole | Orange Peel | Primary | Secondary | Corrosion resistance | Workability | Weldability |
| 131 | 1.0 | 150 | X | X | X | X | Δ | Δ | >1000 |
| 132 | 1.0 | 150 | Δ | Δ | Δ | Δ | Δ | ○ | >1000 |
| 133 | 1.0 | 150 | Δ | Δ | Δ | X | Δ | ○ | >1000 |
| 134 | 1.0 | 150 | Δ | Δ | X | X | Δ | ○ | >1000 |
| 135 | 1.0 | 150 | ○ | ○ | X | X | Δ | ○ | >1000 |
| 136 | 1.0 | 150 | Δ | Δ | Δ | Δ | Δ | X | >1000 |
| 137 | 1.0 | 150 | Δ | Δ | Δ | Δ | Δ | Δ | >1000 |
| 138 | 1.0 | 150 | ○ | ○ | X | X | ⊙ | X | 800 |

TABLE 1-2-continued

| | | | | | | | | | |
|---|---|---|---|---|---|---|---|---|---|
| 139 | 1.0 | 150 | ○ | ○ | ○ | Δ | X | ○ | >1000 |
| 140 | 5.0 | 150 | X | X | ○ | ○ | ⊙ | X | 400 |
| 141 | 1.0 | 150 | ○ | ○ | Δ | Δ | X | Δ | >1000 |
| 142 | 1.0 | 150 | X | X | ○ | ○ | ○ | X | 600 |
| 143 | 1.0 | 150 | Δ | Δ | X | X | Δ | ○ | >1000 |

*Sample Nos. 131-143 were comparative samples.

Example 2

Preparation of chromating solution

A suitable amount of a reducing agent (phosphoric acid) was added to chromic acid (2 M) to adjust the molar ratio of trivalent chromium to total chromium in the solution from 0 to 1. With the pH of the solution being adjusted between 1 and 1.9 by addition of phosphoric acid, 0.03-0.8M of zinc oxide was added to stabilize the solution. The so prepared solution were left to stand for 24 h and checking was made as to whether the solutions gelled. The solutions that did not gel were roll-coated onto degreased Zn-Ni plated steel plates (Ni content=12%; plate deposit=20 g/m$^2$) to give various chromate deposits (T-Cr=20-100 mg/m$^2$).

Preparation of resin paint

Xylene (100 g) was added to 100 g of a bisphenol A type epoxy resin ("Epikote 1007" of Shell Chemical Co.; epoxy equivalent=2,000) and the mixture was stirred to form a uniform solution. To the solution, 4.7 g of diethanolamine was added dropwise at 80° C. over a period of 1 h, followed by reaction at 80° C. for an additional 3 h. The reaction was found to have ended when the extinction of epoxy groups was verified by chemical analysis.

To 100 parts by weight of the thus obtained modified epoxy resin, 0-50 parts by weight of a silane coupling agent (see below), 0-80 parts by weight of an amino resin (see below) and 5-300 parts by weight of colloidal silica dispersed in an organic solvent were added and mixed to prepare paints.

The paints were applied by bar coating onto the previously chromated steel plates and the applied coatings were baked at a plate temperature of 150° C. for 30 sec to form solid films having an average resin deposit of 1.5 g/m$^2$. The steel plates thus provided with organic resin coatings under the various conditions described above were designated sample Nos. 201-248 of the present invention and comparative sample Nos. 249-272 and are shown in Table 2.

The dissolution of chromium out of the samples, their electrodeposition quality, film adhesion after the application of a second coat, the corrosion resistance of blank before electrodeposition and their workability were evaluated by the following methods.

Chromium dissolution

The samples were degreased with an ordinary sprayable alkali and subsequently phosphated with "Palbond-L3020" of Nihon Parkerizing Co., Ltd. The chromium deposit was measured by X-ray fluoroscopy before and after the degreasing and phosphating treatments and the amount of Cr dissolution was determined by subtracting the amount of Cr deposit after the treatments from the initial value.

Electrodeposition quality

Appearance after electrodeposition

Power Top U-100 (Nippon Paint Co., Ltd.) was electrodeposited at a voltage of 100 volts in a bath of 28° C. with an electric current applied for 180 sec, and the applied coating was baked at 170° C. for 20 min to form a film in a thickness of 20 μm. The number of craters formed in the surface of the electrodeposited film was counted and the appearance of the film was evaluated by the following criteria: ○, 1-6 craters/cm$^2$; Δ, 7-10 craters/cm; X, >10 craters/cm$^2$.

Film adhesion after application of a second coat

The samples with an electrodeposited coat were spray-coated with an Neoamilac B002 White (Kansai Paint Co., Ltd.) to form a second coat in a thickness of 30 μm. Thereafter, the samples were subjected to a waterproofing secondary adhesion test by the following procedure: the samples were immersed in hot pure water (40° C.) for 240 h; within 10 min after recovery from the water, 100 cross cuts 2 mm apart were formed through the second coat with a cutter knife and an adhesive tape was applied over the cross-hatched area; the tape was quickly pulled off and the number of squares that were pulled off was counted. The results were evaluated by the following criteria: ⊙, 0/100; ○, 1/100; Δ, 2-10/100; X, ≧ 11/100.

Corrosion resistance

The samples were subjected to a cycle corrosion test (CCT) in which one cycle consisted of spraying with 5 wt % NaCl at 35° C. for 4 h, drying at 60° C. for 2 h, and leaving in a hot and humid atmosphere (50° C.×95% r.h.) for 2 h. The coverage by red rust after 200 cycles was evaluated by the following criteria: ⊙, non; ○, <10%; Δ, 10-50%; X, >50%.

Workability

Each of the blank samples (90 mm$^\phi$) was drawn to form a cylinder (50 mm$^\phi$×25 mm$^D$) with a blank holder force of 1 ton. An adhesive tape was applied onto the worked area and quickly pulled off. The amount of the resin coat that was pulled off was measured in milligrams per circumference and the results were evaluated by the following criteria: ⊙, <1 mg; ○, 1 to less than 2 mg; Δ, 2 to less than 5 mg; X, >5 mg.

The results of the tests conducted are shown in Table 2.

Example 3

Preparation of chromating solution

A suitable amount of a reducing agent (phosphoric acid) was added to chromic acid (2M) to adjust the molar ratio of trivalent chromium to total chromium in the solution from 0 to 1. With the pH of the solution being adjusted between 1 and 1.9 by addition of phosphoric acid, 0.03-0.8M of zinc oxide was added to stabilize the solution. Thereafter, colloidal silica ("Snowtex"

of acid stabilized type produced by Nissan Chemical Industries, Ltd.) was added in an amount of 0–350 wt % of total chromium. The so prepared solutions were left to stand for 24 h and checking was made as to whether the solution gelled. The solutions that did not gel were roll-coated onto degreased Zn-Ni plated steel plates (Ni content=12%; plate deposit=20 g/m²) to give various chromate deposits (T-Cr=20-100 mg/m²).

Preparation of resin paint

Resin paints were prepared in entirely the same manner as in Example 2, and applied onto the previously chromated steel plates and baked under conditions that were entirely the same as those employed in Example 2. The steel plates thus provided with organic resin coatings were designated sample Nos. 301–409 of the present invention and comparative sample Nos. 410–433 and are shown in Table 3.

The dissolution of chromium out of the samples, their electrodeposition quality, film adhesion after the application of a second coat, the corrosion resistance of blank before electrodeposition and their workability were evaluated by methods which were entirely the same as those employed in Example 2. The results are shown in Table 3.

Sample Nos. 401–409 of the present invention and comparative sample Nos. 410–421 were further subjected to an as-worked corrosion test by the following procedure and the results are also shown in Table 3.

As-worked corrosion resistance

Each of the blank samples (90 mm$^\phi$) was drawn to form a cylinder (50 mm$^\phi$×25 mm$^D$) with a blank holder force of 1 ton. The cylinders were subjected to a cycle corrosion test under the same conditions as described above. After 100 cycles, the coverage by red rust was evaluated by the following criteria: ⊙, none; ○, <10%; Δ, 10-50%; X, >50%.

The identification numbers and symbols of epoxy resins, dialkanolamines, silane coupling agents and amino resins that appear in Tables 2 and 3 have the following meanings:

(1) Base epoxy resin:

| | | |
|---|---|---|
| 1. | Epikote 1001 | Shell Chemical Co. |
| 2. | Epikote 1004 | " |
| 3. | Epikote 1007 | " |
| 4. | Epikote 1009 | " |
| 5. | Epikote 1010 | " |
| 6. | Epikote 834 | " |
| 7. | EPICLON EXA-123 | Dainippon Ink & Chemicals, Inc. |

(2) Dialkanolamine

1. Diethanolamine
2. Dibutanolamine (3) Silane coupling agent

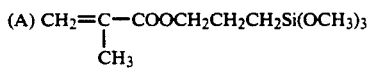

(B) $HSCH_2CH_2CH_2Si(OCH_3)_3$
(C) $CH_3Si(OCH_3)_3$

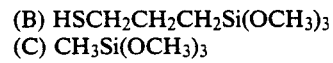

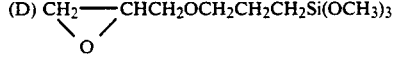
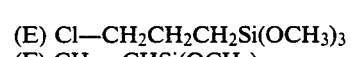
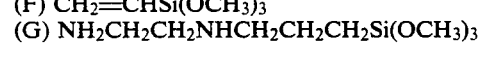

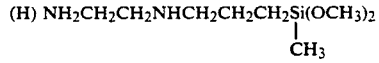

(4) Amino resin

1. Benzoguanamine
2. Melamine

TABLE 2-1

| | Substrate plate | | Chromate film | | | Resin film | | | | | | |
|---|---|---|---|---|---|---|---|---|---|---|---|---|
| | | | | | Chromate | | | Dial- | | Silane coupling | | |
| | | Plate | $Cr^{3+}/$ | T—Cr/ | deposit, | Epoxy resin | | kanolamine | | agent | | Amino resin |
| Sample No.* | Plate type | deposit, g/m² | T—Cr ratio | ZnO ratio | mg/m² (as metallic Cr) | Type | Epoxy equivalent | Type | No. of moles | Type | Parts by weight | Type | Parts by weight |
| 201 | Zn—NI | 20 | 0.7 | 4 | 60 | 3 | 2000 | 1 | 0.9 | D | 3 | 1 | 40 |
| 202 | Zn—NI | 20 | 0.7 | 6 | 60 | 3 | 2000 | 1 | 0.9 | D | 3 | 1 | 40 |
| 203 | Zn—NI | 20 | 0.7 | 8 | 60 | 3 | 2000 | 1 | 0.9 | D | 3 | 1 | 40 |
| 204 | Zn—NI | 20 | 0.7 | 12 | 60 | 3 | 2000 | 1 | 0.9 | D | 3 | 1 | 40 |
| 205 | Zn—NI | 20 | 0.7 | 25 | 60 | 3 | 2000 | 1 | 0.9 | D | 3 | 1 | 40 |
| 206 | Zn—NI | 20 | 0.6 | 4 | 60 | 3 | 2000 | 1 | 0.9 | D | 3 | 1 | 40 |
| 207 | Zn—NI | 20 | 0.6 | 6 | 60 | 3 | 2000 | 1 | 0.9 | D | 3 | 1 | 40 |
| 208 | Zn—NI | 20 | 0.6 | 8 | 60 | 3 | 2000 | 1 | 0.9 | D | 3 | 1 | 40 |
| 209 | Zn—NI | 20 | 0.6 | 12 | 60 | 3 | 2000 | 1 | 0.9 | D | 3 | 1 | 40 |
| 210 | Zn—NI | 20 | 0.5 | 25 | 60 | 3 | 2000 | 1 | 0.9 | D | 3 | 1 | 40 |
| 211 | Zn—NI | 20 | 0.5 | 4 | 60 | 3 | 2000 | 1 | 0.9 | D | 3 | 1 | 40 |
| 212 | Zn—NI | 20 | 0.5 | 6 | 60 | 3 | 2000 | 1 | 0.9 | D | 3 | 1 | 40 |
| 213 | Zn—NI | 20 | 0.5 | 8 | 60 | 3 | 2000 | 1 | 0.9 | D | 3 | 1 | 40 |
| 214 | Zn—NI | 20 | 0.5 | 12 | 60 | 3 | 2000 | 1 | 0.9 | D | 3 | 1 | 40 |
| 215 | Zn—NI | 20 | 0.5 | 25 | 60 | 3 | 2000 | 1 | 0.9 | D | 3 | 1 | 40 |
| 216 | Zn—NI | 20 | 0.05 | 4 | 60 | 3 | 2000 | 1 | 0.9 | D | 3 | 1 | 40 |
| 217 | Zn—NI | 20 | 0.05 | 6 | 60 | 3 | 2000 | 1 | 0.9 | D | 3 | 1 | 40 |
| 218 | Zn—NI | 20 | 0.05 | 8 | 60 | 3 | 2000 | 1 | 0.9 | D | 3 | 1 | 40 |
| 219 | Zn—NI | 20 | 0.05 | 12 | 60 | 3 | 2000 | 1 | 0.9 | D | 3 | 1 | 40 |
| 220 | Zn—NI | 20 | 0.05 | 25 | 60 | 3 | 2000 | 1 | 0.9 | D | 3 | 1 | 40 |
| 221 | Zn—NI | 20 | 0.5 | 6 | 60 | 1 | 500 | 1 | 0.9 | D | 3 | 1 | 40 |
| 222 | Zn—NI | 20 | 0.5 | 6 | 60 | 2 | 1000 | 1 | 0.9 | D | 3 | 1 | 40 |
| 223 | Zn—NI | 20 | 0.5 | 6 | 60 | 4 | 3000 | 1 | 0.9 | D | 3 | 1 | 40 |

TABLE 2-1-continued

| | | | | | | | | | | | | | |
|---|---|---|---|---|---|---|---|---|---|---|---|---|---|
| 224 | Zn—Ni | 20 | 0.5 | 6 | 60 | 5 | 5000 | 1 | 0.9 | D | 3 | 1 | 40 |

| | Resin film | | | | Characteristics | | | | |
|---|---|---|---|---|---|---|---|---|---|
| Sample No.* | Silica Parts by weight | Resin deposit, g/m² | Baking temperature, °C. | Stability of chromating solution | Chromium dessolution, mg/m² (as metallic Cr) | Appearance of deposited film | Water-resistance secondary adhesion | Corrosion resistance | Work-ability |
| 201 | 40 | 1 | 150 | good | 0 | ○ | ⊙ | ⊙ | ⊙ |
| 202 | 40 | 1 | 150 | good | 0 | ○ | ⊙ | ⊙ | ⊙ |
| 203 | 40 | 1 | 150 | good | 0 | ○ | ⊙ | ⊙ | ⊙ |
| 204 | 40 | 1 | 150 | good | 0 | ○ | ⊙ | ⊙ | ⊙ |
| 205 | 40 | 1 | 150 | good | 0 | ○ | ⊙ | ⊙ | ⊙ |
| 206 | 40 | 1 | 150 | good | 0 | ○ | ⊙ | ⊙ | ⊙ |
| 207 | 40 | 1 | 150 | good | 0 | ○ | ⊙ | ⊙ | ⊙ |
| 208 | 40 | 1 | 150 | good | 0 | ○ | ⊙ | ⊙ | ⊙ |
| 209 | 40 | 1 | 150 | good | 0 | ○ | ⊙ | ⊙ | ⊙ |
| 210 | 40 | 1 | 150 | good | 0 | ○ | ⊙ | ⊙ | ⊙ |
| 211 | 40 | 1 | 150 | good | 0 | ○ | ⊙ | ⊙ | ⊙ |
| 212 | 40 | 1 | 150 | good | 0 | ○ | ⊙ | ⊙ | ⊙ |
| 213 | 40 | 1 | 150 | good | 0 | ○ | ⊙ | ⊙ | ⊙ |
| 214 | 40 | 1 | 150 | good | 0 | ○ | ⊙ | ⊙ | ⊙ |
| 215 | 40 | 1 | 150 | good | 0 | ○ | ⊙ | ⊙ | ⊙ |
| 216 | 40 | 1 | 150 | good | 0 | ○ | ⊙ | ⊙ | ⊙ |
| 217 | 40 | 1 | 150 | good | 0 | ○ | ⊙ | ⊙ | ⊙ |
| 218 | 40 | 1 | 150 | good | 0 | ○ | ⊙ | ⊙ | ⊙ |
| 219 | 40 | 1 | 150 | good | 0 | ○ | ⊙ | ⊙ | ⊙ |
| 220 | 40 | 1 | 150 | good | 0 | ○ | ⊙ | ⊙ | ⊙ |
| 221 | 40 | 1 | 150 | good | 0 | ○ | ⊙ | ⊙ | ⊙ |
| 222 | 40 | 1 | 150 | good | 0 | ○ | ⊙ | ⊙ | ⊙ |
| 223 | 40 | 1 | 150 | good | 0 | ○ | ⊙ | ⊙ | ⊙ |
| 224 | 40 | 1 | 150 | good | 0 | ○ | ⊙ | ⊙ | ⊙ |

*Sample Nos. 201-224 were all within the scope of the invention.

TABLE 2-2

| | Substrate plate | | Chromate film | | | Resin film | | | | | | | |
|---|---|---|---|---|---|---|---|---|---|---|---|---|---|
| Sample No.* | Plate type | Plate deposit, g/m² | Cr³⁺/ T—Cr ratio | T—Cr/ ZnO ratio | Chromate deposit, mg/m² (as metallic Cr) | Epoxy resin Type | Epoxy equivalent | Dialkanolamine Type | No. of moles | Silane coupling agent Type | Parts by weight | Amino resin Type | Parts by weight |
| 225 | Zn—Ni | 20 | 0.5 | 6 | 60 | 3 | 2000 | 2 | 0.9 | D | 3 | 1 | 40 |
| 226 | Zn—Ni | 20 | 0.5 | 6 | 60 | 3 | 2000 | 1 | 0.8 | D | 3 | 1 | 40 |
| 227 | Zn—Ni | 20 | 0.5 | 6 | 60 | 3 | 2000 | 1 | 1 | D | 3 | 1 | 40 |
| 228 | Zn—Ni | 20 | 0.5 | 6 | 60 | 3 | 2000 | 1 | 0.9 | A | 3 | 1 | 40 |
| 229 | Zn—Ni | 20 | 0.5 | 6 | 60 | 3 | 2000 | 1 | 0.9 | B | 3 | 1 | 40 |
| 230 | Zn—Ni | 20 | 0.5 | 6 | 60 | 3 | 2000 | 1 | 0.9 | E | 3 | 1 | 40 |
| 231 | Zn—Ni | 20 | 0.5 | 6 | 200 | 3 | 2000 | 1 | 0.9 | F | 3 | 1 | 40 |
| 232 | Zn—Ni | 20 | 0.5 | 6 | 200 | 3 | 2000 | 1 | 0.9 | D | 0.5 | 1 | 40 |
| 233 | Zn—Ni | 20 | 0.5 | 6 | 200 | 3 | 2000 | 1 | 0.9 | D | 10 | 1 | 40 |
| 234 | Zn—Ni | 20 | 0.5 | 6 | 200 | 3 | 2000 | 1 | 0.9 | D | 3 | 2 | 40 |
| 235 | Zn—Ni | 20 | 0.5 | 6 | 200 | 3 | 2000 | 1 | 0.9 | D | 3 | 1 | 5 |
| 236 | Zn—Ni | 20 | 0.5 | 6 | 200 | 3 | 2000 | 1 | 0.9 | D | 3 | 1 | 70 |
| 237 | Zn—Ni | 20 | 0.5 | 6 | 200 | 3 | 2000 | 1 | 0.9 | D | 3 | 1 | 40 |
| 238 | Zn—Ni | 20 | 0.5 | 6 | 60 | 3 | 2000 | 1 | 0.9 | D | 3 | 1 | 40 |
| 239 | Zn—Ni | 20 | 0.5 | 6 | 60 | 3 | 2000 | 1 | 0.9 | D | 3 | 1 | 40 |
| 240 | Zn—Ni | 20 | 0.5 | 6 | 100 | 3 | 2000 | 1 | 0.9 | D | 3 | 1 | 40 |
| 241 | Zn—Ni | 20 | 0.5 | 6 | 100 | 3 | 2000 | 1 | 0.9 | D | 3 | 1 | 40 |
| 242 | Zn—Ni | 20 | 0.5 | 6 | 100 | 3 | 2000 | 1 | 0.9 | D | 3 | 1 | 40 |
| 243 | Zn—Ni | 20 | 0.5 | 6 | 30 | 3 | 2000 | 1 | 0.9 | D | 3 | 1 | 40 |
| 244 | Zn—Fe | 40 | 0.5 | 6 | 60 | 3 | 2000 | 1 | 0.9 | D | 3 | 1 | 40 |
| 245 | Zn—Al | 40 | 0.5 | 6 | 60 | 3 | 2000 | 1 | 0.9 | D | 3 | 1 | 40 |
| 246 | Zn—Mg | 20 | 0.5 | 6 | 60 | 3 | 2000 | 1 | 0.9 | D | 3 | 1 | 40 |
| 247 | Zn—Al₂O₃ | 20 | 0.5 | 6 | 60 | 3 | 2000 | 1 | 0.9 | D | 3 | 1 | 40 |
| 248 | Zn—Mn | 20 | 0.5 | 6 | 60 | 3 | 2000 | 1 | 0.9 | D | 3 | 1 | 40 |

| | Resin film | | | | Characteristics | | | | |
|---|---|---|---|---|---|---|---|---|---|
| Sample No.* | Silica Parts by weight | Resin deposit, g/m² | Baking temperature, °C. | Stability of chromating solution | Chromium dessolution, mg/m² (as metallic Cr) | Appearance of deposited film | Water-resistance secondary adhesion | Corrosion resistance | Work-ability |
| 225 | 40 | 1 | 140 | good | 0 | ○ | ⊙ | ⊙ | ⊙ |
| 226 | 40 | 1 | 140 | good | 0 | ○ | ⊙ | ⊙ | ⊙ |
| 227 | 40 | 1 | 200 | good | 0 | ○ | ⊙ | ⊙ | ⊙ |
| 228 | 40 | 1 | 200 | good | 0 | ○ | ⊙ | ⊙ | ⊙ |
| 229 | 40 | 1 | 200 | good | 0 | ○ | ⊙ | ⊙ | ⊙ |
| 230 | 40 | 1 | 150 | good | 0 | ○ | ⊙ | ⊙ | ⊙ |
| 231 | 40 | 1 | 150 | good | 0 | ○ | ⊙ | ⊙ | ⊙ |
| 232 | 40 | 1 | 150 | good | 0 | ○ | ○ | ⊙ | ⊙ |
| 233 | 40 | 1 | 150 | good | 0 | ○ | ○ | ⊙ | ⊙ |
| 234 | 40 | 1 | 150 | good | 0 | ○ | ○ | ⊙ | ⊙ |

TABLE 2-2-continued

| | | | | | | | | | | |
|---|---|---|---|---|---|---|---|---|---|---|
| 235 | 40 | 1 | 150 | good | 0 | ○ | ⊙ | ⊙ | ⊙ | ⊙ |
| 236 | 40 | 1 | 150 | good | 0 | ○ | ⊙ | ⊙ | ⊙ | ⊙ |
| 237 | 10 | 1 | 150 | good | 0 | ○ | ⊙ | ⊙ | ⊙ | ⊙ |
| 238 | 100 | 1 | 150 | good | 0 | ○ | ⊙ | ⊙ | ⊙ | ⊙ |
| 239 | 150 | 1 | 150 | good | 0 | ○ | ⊙ | ⊙ | ⊙ | ⊙ |
| 240 | 20 | 3 | 150 | good | 0 | Δ | ⊙ | ⊙ | ⊙ | ⊙ |
| 241 | 20 | 0.3 | 150 | good | 0 | ○ | ⊙ | ⊙ | ⊙ | ⊙ |
| 242 | 20 | 0.5 | 150 | good | 0 | ○ | ⊙ | ⊙ | ⊙ | ⊙ |
| 243 | 20 | 0.5 | 150 | good | 0 | ○ | ⊙ | ⊙ | ⊙ | ⊙ |
| 244 | 40 | 1 | 150 | good | 0 | ○ | ⊙ | ⊙ | ⊙ | ⊙ |
| 245 | 40 | 1 | 150 | good | 0 | ○ | ⊙ | ⊙ | ⊙ | ⊙ |
| 246 | 40 | 1 | 150 | good | 0 | ○ | ⊙ | ⊙ | ⊙ | ⊙ |
| 247 | 40 | 1 | 150 | good | 0 | ○ | ⊙ | ⊙ | ⊙ | ⊙ |
| 248 | 40 | 1 | 150 | good | 0 | ○ | ⊙ | ⊙ | ⊙ | ⊙ |

*Sample Nos. 225–248 were all within the scope of the invention.

TABLE 2-3

| | Substrate plate | | Chromate film | | | Resin film | | | | | | |
|---|---|---|---|---|---|---|---|---|---|---|---|---|
| | | Plate | $Cr^{3+}/$ | T-Cr/ | Chromate | Epoxy resin | | Dialkanolamine | | Silane coupling agent | | Amino resin | |
| Sample No.* | Plate type | deposit, $g/m^2$ | T-Cr ratio | ZnO ratio | deposit, $mg/m^2$ (as metallic Cr) | Type | Epoxy equivalent | Type | No. of moles | Type | Parts by weight | Type | Parts by weight |
| 249 | Zn—Ni | 20 | 0.8 | — | 60 | — | — | — | — | — | — | — | — |
| 250 | Zn—Ni | 20 | 1 | — | 60 | — | — | — | — | — | — | — | — |
| 251 | Zn—Ni | 20 | 0 | 25 | 60 | 3 | 2000 | 1 | 0.9 | D | 3 | 1 | 40 |
| 252 | Zn—Ni | 20 | 0.03 | 25 | 60 | 3 | 2000 | 1 | 0.9 | D | 3 | 1 | 40 |
| 253 | Zn—Ni | 20 | 0.5 | 6 | 60 | 6 | 250 | 1 | 0.9 | D | 3 | 1 | 40 |
| 254 | Zn—Ni | 20 | 0.5 | 6 | 60 | 7 | >5000 | 1 | 0.9 | D | 3 | 1 | 40 |
| 255 | Zn—Ni | 20 | 0.5 | 6 | 60 | 3 | 2000 | 1 | 0.5 | D | 3 | 1 | 40 |
| 256 | Zn—Ni | 20 | 0.5 | 6 | 60 | 3 | 2000 | 1 | 1.2 | D | 3 | 1 | 40 |
| 257 | Zn—Ni | 20 | 0.5 | 1 | 60 | — | — | — | — | — | — | — | — |
| 258 | Zn—Ni | 20 | 0.5 | 3 | 60 | — | — | — | — | — | — | — | — |
| 259 | Zn—Ni | 20 | 0.5 | 28 | 60 | 3 | 2000 | 1 | 0.9 | D | 3 | 1 | 40 |
| 260 | Zn—Ni | 20 | 0.5 | 50 | 60 | 3 | 2000 | 1 | 0.9 | D | 3 | 1 | 40 |
| 261 | Zn—Ni | 20 | 0.5 | 6 | 60 | 3 | 2000 | 1 | 0.9 | G | 3 | 1 | 40 |
| 262 | Zn—Ni | 20 | 0.5 | 6 | 60 | 3 | 2000 | 1 | 0.9 | H | 3 | 1 | 40 |
| 263 | Zn—Ni | 20 | 0.5 | 6 | 60 | 3 | 2000 | 1 | 0.9 | D | 0.3 | 1 | 40 |
| 264 | Zn—Ni | 20 | 0.5 | 6 | 60 | 3 | 2000 | 1 | 0.9 | D | 12 | 1 | 40 |
| 265 | Zn—Ni | 20 | 0.5 | 6 | 60 | 3 | 2000 | 1 | 0.9 | D | 3 | 1 | 2 |
| 266 | Zn—Ni | 20 | 0.5 | 6 | 60 | 3 | 2000 | 1 | 0.9 | D | 3 | 1 | 80 |
| 267 | Zn—Ni | 20 | 0.5 | 6 | 60 | 3 | 2000 | 1 | 0.9 | D | 3 | 1 | 40 |
| 268 | Zn—Ni | 20 | 0.5 | 6 | 60 | 3 | 2000 | 1 | 0.9 | D | 3 | 1 | 40 |
| 269 | Zn—Ni | 20 | 0.5 | 6 | 60 | 3 | 2000 | 1 | 0.9 | D | 3 | 1 | 40 |
| 270 | Zn—Ni | 20 | 0.5 | 6 | 60 | 3 | 2000 | 1 | 0.9 | D | 3 | 1 | 40 |
| 271 | Zn—Ni | 20 | 0.5 | 6 | 3 | 3 | 2000 | 1 | 0.9 | D | 3 | 1 | 40 |
| 272 | Zn—Ni | 20 | 0.5 | 6 | 800 | 3 | 2000 | 1 | 0.9 | D | 3 | 1 | 40 |

| | Resin film | | | | Characteristics | | | | |
|---|---|---|---|---|---|---|---|---|---|
| Sample No.* | Silica Parts by weight | Resin deposit, $g/m^2$ | Baking temperature, °C. | Stability of chromating solution | Chromium dessolution, $mg/m^2$ (as metallic Cr) | Appearance of deposited film | Water-resistance secondary adhesion | Corrosion resistance | Workability |
| 249 | — | — | — | gelled | — | — | — | — | — |
| 250 | — | — | — | gelled | — | — | — | — | — |
| 251 | 40 | 1 | 150 | good | 40 | ⊙ | ⊙ | ○ | ⊙ |
| 252 | 40 | 1 | 150 | good | 20 | ⊙ | ⊙ | ○ | ⊙ |
| 253 | 40 | 1 | 150 | good | 0 | Δ~X | Δ | Δ | ⊙ |
| 254 | 40 | 1 | 150 | good | 0 | Δ~X | Δ | ○ | ⊙ |
| 255 | 40 | 1 | 150 | good | 0 | Δ~X | Δ | ⊙ | ⊙ |
| 256 | 40 | 1 | 150 | good | 0 | Δ~X | Δ | Δ | ⊙ |
| 257 | — | — | — | gelled | — | — | — | — | — |
| 258 | — | — | — | gelled | — | — | — | — | — |
| 259 | 40 | 1 | 150 | good | 10 | ⊙ | ⊙ | ⊙ | ⊙ |
| 260 | 40 | 1 | 150 | good | 10 | ⊙ | ⊙ | ⊙ | ⊙ |
| 261 | 40 | 1 | 150 | paint gelled | — | — | — | — | — |
| 262 | 40 | 1 | 150 | paint gelled | — | — | — | — | — |
| 263 | 40 | 1 | 150 | good | 0 | Δ | Δ~X | ○ | ⊙ |
| 264 | 40 | 1 | 150 | good | 0 | Δ~X | Δ~X | ○ | ⊙ |
| 265 | 40 | 1 | 150 | good | 0 | ⊙ | Δ~X | Δ | Δ |
| 266 | 40 | 1 | 150 | good | 0 | X | Δ~X | ○ | ⊙ |
| 267 | 5 | 5 | 150 | good | 0 | ○ | ⊙ | X | ⊙ |
| 268 | 300 | 5 | 150 | good | 0 | ⊙ | X | ○ | X |
| 269 | 40 | 5 | 150 | good | 0 | X | ⊙ | ⊙ | X |
| 270 | 40 | 0.05 | 150 | good | 0 | ⊙ | ⊙ | X | ⊙ |
| 271 | 40 | 1 | 150 | good | 0 | ⊙ | X | X | Δ |
| 272 | 40 | 1 | 150 | good | 0 | Δ | Δ | ⊙ | X |

Sample Nos. 249–272 were comparative samples.

TABLE 3-1

| Sample No.* | Substrate plate Plate type | Plate deposit, g/m² | Chromate film Cr³⁺/T-Cr ratio | T-Cr/ZnO ratio | SiO₂/T-Cr ratio (%) | Chromate deposit, mg/m² (as metallic Cr) | Epoxy resin Type | Epoxy equivalent | Dialkanolamine Type | No. of moles | Silane coupling agent Type | Parts by weight | Amino resin Type | Parts by weight |
|---|---|---|---|---|---|---|---|---|---|---|---|---|---|---|
| 301 | Zn—Ni | 20 | 0.7 | 4 | 50 | 60 | 3 | 2000 | 1 | 0.9 | D | 3 | 1 | 40 |
| 302 | Zn—Ni | 20 | 0.7 | 4 | 100 | 60 | 3 | 2000 | 1 | 0.9 | D | 3 | 1 | 40 |
| 303 | Zn—Ni | 20 | 0.7 | 4 | 250 | 60 | 3 | 2000 | 1 | 0.9 | D | 3 | 1 | 40 |
| 304 | Zn—Ni | 20 | 0.7 | 4 | 300 | 60 | 3 | 2000 | 1 | 0.9 | D | 3 | 1 | 40 |
| 305 | Zn—Ni | 20 | 0.7 | 6 | 50 | 60 | 3 | 2000 | 1 | 0.9 | D | 3 | 1 | 40 |
| 306 | Zn—Ni | 20 | 0.7 | 6 | 100 | 60 | 3 | 2000 | 1 | 0.9 | D | 3 | 1 | 40 |
| 307 | Zn—Ni | 20 | 0.7 | 6 | 250 | 60 | 3 | 2000 | 1 | 0.9 | D | 3 | 1 | 40 |
| 308 | Zn—Ni | 20 | 0.7 | 6 | 300 | 60 | 3 | 2000 | 1 | 0.9 | D | 3 | 1 | 40 |
| 309 | Zn—Ni | 20 | 0.7 | 8 | 50 | 60 | 3 | 2000 | 1 | 0.9 | D | 3 | 1 | 40 |
| 310 | Zn—Ni | 20 | 0.7 | 8 | 100 | 60 | 3 | 2000 | 1 | 0.9 | D | 3 | 1 | 40 |
| 311 | Zn—Ni | 20 | 0.7 | 8 | 250 | 60 | 3 | 2000 | 1 | 0.9 | D | 3 | 1 | 40 |
| 312 | Zn—Ni | 20 | 0.7 | 8 | 300 | 60 | 3 | 2000 | 1 | 0.9 | D | 3 | 1 | 40 |
| 313 | Zn—Ni | 20 | 0.7 | 12 | 50 | 60 | 3 | 2000 | 1 | 0.9 | D | 3 | 1 | 40 |
| 314 | Zn—Ni | 20 | 0.7 | 12 | 100 | 60 | 3 | 2000 | 1 | 0.9 | D | 3 | 1 | 40 |
| 315 | Zn—Ni | 20 | 0.7 | 12 | 250 | 60 | 3 | 2000 | 1 | 0.9 | D | 3 | 1 | 40 |
| 316 | Zn—Ni | 20 | 0.7 | 12 | 300 | 60 | 3 | 2000 | 1 | 0.9 | D | 3 | 1 | 40 |
| 317 | Zn—Ni | 20 | 0.7 | 25 | 50 | 60 | 3 | 2000 | 1 | 0.9 | D | 3 | 1 | 40 |
| 318 | Zn—Ni | 20 | 0.7 | 25 | 100 | 60 | 3 | 2000 | 1 | 0.9 | D | 3 | 1 | 40 |
| 319 | Zn—Ni | 20 | 0.7 | 25 | 250 | 60 | 3 | 2000 | 1 | 0.9 | D | 3 | 1 | 40 |
| 320 | Zn—Ni | 20 | 0.7 | 25 | 300 | 60 | 3 | 2000 | 1 | 0.9 | D | 3 | 1 | 40 |

| Sample No.* | Resin film Silica Parts by weight | Resin deposit, g/m² | Baking temperature, °C | Stability of chromating solution | Characteristics Chromium dessolution, mg/m² (as metallic Cr) | Appearance of deposited film | Water-resistance secondary adhesion | Corrosion resistance | Workability |
|---|---|---|---|---|---|---|---|---|---|
| 301 | 40 | 1 | 150 | good | 0 | ○ | ⊙ | ⊙ | ⊙ |
| 302 | 40 | 1 | 150 | good | 0 | ○ | ⊙ | ⊙ | ⊙ |
| 303 | 40 | 1 | 150 | good | 0 | ○ | ⊙ | ⊙ | ⊙ |
| 304 | 40 | 1 | 150 | good | 0 | ○ | ⊙ | ⊙ | ⊙ |
| 305 | 40 | 1 | 150 | good | 0 | ○ | ⊙ | ⊙ | ⊙ |
| 306 | 40 | 1 | 150 | good | 0 | ○ | ⊙ | ⊙ | ⊙ |
| 307 | 40 | 1 | 150 | good | 0 | ○ | ⊙ | ⊙ | ⊙ |
| 308 | 40 | 1 | 150 | good | 0 | ○ | ⊙ | ⊙ | ⊙ |
| 309 | 40 | 1 | 150 | good | 0 | ○ | ⊙ | ⊙ | ⊙ |
| 310 | 40 | 1 | 150 | good | 0 | ○ | ⊙ | ⊙ | ⊙ |
| 311 | 40 | 1 | 150 | good | 0 | ○ | ⊙ | ⊙ | ⊙ |
| 312 | 40 | 1 | 150 | good | 0 | ○ | ⊙ | ⊙ | ⊙ |
| 313 | 40 | 1 | 150 | good | 0 | ○ | ⊙ | ⊙ | ⊙ |
| 314 | 40 | 1 | 150 | good | 0 | ○ | ⊙ | ⊙ | ⊙ |
| 315 | 40 | 1 | 150 | good | 0 | ○ | ⊙ | ⊙ | ⊙ |
| 316 | 40 | 1 | 150 | good | 0 | ○ | ⊙ | ⊙ | ⊙ |
| 317 | 40 | 1 | 150 | good | 0 | ○ | ⊙ | ⊙ | ⊙ |
| 318 | 40 | 1 | 150 | good | 0 | ○ | ⊙ | ⊙ | ⊙ |
| 319 | 40 | 1 | 150 | good | 0 | ○ | ⊙ | ⊙ | ⊙ |
| 320 | 40 | 1 | 150 | good | 0 | ○ | ⊙ | ⊙ | ⊙ |

*Sample Nos. 301–320 were all within the scope of the invention.

TABLE 3-2

| Sample No.* | Substrate plate Plate type | Plate deposit, g/m² | Chromate film Cr³⁺/T-Cr ratio | T-Cr/ZnO ratio | SiO₂/T-Cr ratio (%) | Chromate deposit, mg/m² (as metallic Cr) | Epoxy resin Type | Epoxy equivalent | Dialkanolamine Type | No. of moles | Silane coupling agent Type | Parts by weight | Amino resin Type | Parts by weight |
|---|---|---|---|---|---|---|---|---|---|---|---|---|---|---|
| 321 | Zn—Ni | 20 | 0.6 | 4 | 50 | 60 | 3 | 2000 | 1 | 0.9 | D | 3 | 1 | 40 |
| 322 | Zn—Ni | 20 | 0.6 | 4 | 100 | 60 | 3 | 2000 | 1 | 0.9 | D | 3 | 1 | 40 |
| 323 | Zn—Ni | 20 | 0.6 | 4 | 250 | 60 | 3 | 2000 | 1 | 0.9 | D | 3 | 1 | 40 |
| 324 | Zn—Ni | 20 | 0.6 | 4 | 300 | 60 | 3 | 2000 | 1 | 0.9 | D | 3 | 1 | 40 |
| 325 | Zn—Ni | 20 | 0.6 | 6 | 50 | 60 | 3 | 2000 | 1 | 0.9 | D | 3 | 1 | 40 |
| 326 | Zn—Ni | 20 | 0.6 | 6 | 100 | 60 | 3 | 2000 | 1 | 0.9 | D | 3 | 1 | 40 |
| 327 | Zn—Ni | 20 | 0.6 | 6 | 250 | 60 | 3 | 2000 | 1 | 0.9 | D | 3 | 1 | 40 |
| 328 | Zn—Ni | 20 | 0.6 | 6 | 300 | 60 | 3 | 2000 | 1 | 0.9 | D | 3 | 1 | 40 |
| 329 | Zn—Ni | 20 | 0.6 | 8 | 50 | 60 | 3 | 2000 | 1 | 0.9 | D | 3 | 1 | 40 |
| 330 | Zn—Ni | 20 | 0.6 | 8 | 100 | 60 | 3 | 2000 | 1 | 0.9 | D | 3 | 1 | 40 |
| 331 | Zn—Ni | 20 | 0.6 | 8 | 250 | 60 | 3 | 2000 | 1 | 0.9 | D | 3 | 1 | 40 |
| 332 | Zn—Ni | 20 | 0.6 | 8 | 300 | 60 | 3 | 2000 | 1 | 0.9 | D | 3 | 1 | 40 |
| 333 | Zn—Ni | 20 | 0.6 | 12 | 50 | 60 | 3 | 2000 | 1 | 0.9 | D | 3 | 1 | 40 |
| 334 | Zn—Ni | 20 | 0.6 | 12 | 100 | 60 | 3 | 2000 | 1 | 0.9 | D | 3 | 1 | 40 |
| 335 | Zn—Ni | 20 | 0.6 | 12 | 250 | 60 | 3 | 2000 | 1 | 0.9 | D | 3 | 1 | 40 |
| 336 | Zn—Ni | 20 | 0.6 | 12 | 300 | 60 | 3 | 2000 | 1 | 0.9 | D | 3 | 1 | 40 |
| 337 | Zn—Ni | 20 | 0.6 | 25 | 50 | 60 | 3 | 2000 | 1 | 0.9 | D | 3 | 1 | 40 |
| 338 | Zn—Ni | 20 | 0.6 | 25 | 100 | 60 | 3 | 2000 | 1 | 0.9 | D | 3 | 1 | 40 |

TABLE 3-2-continued

| | | | | | | | | | | | | | | |
|---|---|---|---|---|---|---|---|---|---|---|---|---|---|---|
| 339 | Zn—Ni | 20 | 0.6 | 25 | 250 | 60 | 3 | 2000 | 1 | 0.9 | D | 3 | 1 | 40 |
| 340 | Zn—Ni | 20 | 0.6 | 25 | 300 | 60 | 3 | 2000 | 1 | 0.9 | D | 3 | 1 | 40 |

| | Resin film | | Baking | | Characteristics | | | | |
|---|---|---|---|---|---|---|---|---|---|
| Sample No.* | Silica Parts by weight | Resin deposit, g/m$^2$ | Baking temperature, °C. | Stability of chromating solution | Chromium dessolution, mg/m$^2$ (as metallic Cr) | Appearance of deposited film | Water-resistance secondary adhesion | Corrosion resistance | Workability |
| 321 | 40 | 1 | 150 | good | 0 | ○ | ⊙ | ⊙ | ⊙ |
| 322 | 40 | 1 | 150 | good | 0 | ○ | ⊙ | ⊙ | ⊙ |
| 323 | 40 | 1 | 150 | good | 0 | ○ | ⊙ | ⊙ | ⊙ |
| 324 | 40 | 1 | 150 | good | 0 | ○ | ⊙ | ⊙ | ⊙ |
| 325 | 40 | 1 | 150 | good | 0 | ○ | ⊙ | ⊙ | ⊙ |
| 326 | 40 | 1 | 150 | good | 0 | ○ | ⊙ | ⊙ | ⊙ |
| 327 | 40 | 1 | 150 | good | 0 | ○ | ⊙ | ⊙ | ⊙ |
| 328 | 40 | 1 | 150 | good | 0 | ○ | ⊙ | ⊙ | ⊙ |
| 329 | 40 | 1 | 150 | good | 0 | ○ | ⊙ | ⊙ | ⊙ |
| 330 | 40 | 1 | 150 | good | 0 | ○ | ⊙ | ⊙ | ⊙ |
| 331 | 40 | 1 | 150 | good | 0 | ○ | ⊙ | ⊙ | ⊙ |
| 332 | 40 | 1 | 150 | good | 0 | ○ | ⊙ | ⊙ | ⊙ |
| 333 | 40 | 1 | 150 | good | 0 | ○ | ⊙ | ⊙ | ⊙ |
| 334 | 40 | 1 | 150 | good | 0 | ○ | ⊙ | ⊙ | ⊙ |
| 335 | 40 | 1 | 150 | good | 0 | ○ | ⊙ | ⊙ | ⊙ |
| 336 | 40 | 1 | 150 | good | 0 | ○ | ⊙ | ⊙ | ⊙ |
| 337 | 40 | 1 | 150 | good | 0 | ○ | ⊙ | ⊙ | ⊙ |
| 338 | 40 | 1 | 150 | good | 0 | ○ | ⊙ | ⊙ | ⊙ |
| 339 | 40 | 1 | 150 | good | 0 | ○ | ⊙ | ⊙ | ⊙ |
| 340 | 40 | 1 | 150 | good | 0 | ○ | ⊙ | ⊙ | ⊙ |

*Sample Nos. 321–340 were all within the scope of the invention.

TABLE 3-3

| | Substrate plate | | Chromate film | | | | Resin film | | | | | | | |
|---|---|---|---|---|---|---|---|---|---|---|---|---|---|---|
| | | Plate | | | SiO$_2$/ | | Epoxy resin | | | | Silane coupling agent | | Amino resin | |
| Sample No.* | Plate type | deposit, g/m$^2$ | Cr$^{3+}$/ T-Cr ratio | T-Cr/ ZnO ratio | T-Cr ratio (%) | Chromate deposit, mg/m$^2$ (as metallic Cr) | Type | Epoxy equivalent | Dialkanolamine Type | No. of moles | Type | Parts by weight | Type | Parts by weight |
| 341 | Zn—Ni | 20 | 0.5 | 4 | 50 | 60 | 3 | 2000 | 1 | 0.9 | D | 3 | 1 | 40 |
| 342 | Zn—Ni | 20 | 0.5 | 4 | 100 | 60 | 3 | 2000 | 1 | 0.9 | D | 3 | 1 | 40 |
| 343 | Zn—Ni | 20 | 0.5 | 4 | 250 | 60 | 3 | 2000 | 1 | 0.9 | D | 3 | 1 | 40 |
| 344 | Zn—Ni | 20 | 0.5 | 4 | 300 | 60 | 3 | 2000 | 1 | 0.9 | D | 3 | 1 | 40 |
| 345 | Zn—Ni | 20 | 0.5 | 6 | 50 | 60 | 3 | 2000 | 1 | 0.9 | D | 3 | 1 | 40 |
| 346 | Zn—Ni | 20 | 0.5 | 6 | 100 | 60 | 3 | 2000 | 1 | 0.9 | D | 3 | 1 | 40 |
| 347 | Zn—Ni | 20 | 0.5 | 6 | 250 | 60 | 3 | 2000 | 1 | 0.9 | D | 3 | 1 | 40 |
| 348 | Zn—Ni | 20 | 0.5 | 6 | 300 | 60 | 3 | 2000 | 1 | 0.9 | D | 3 | 1 | 40 |
| 349 | Zn—Ni | 20 | 0.5 | 8 | 50 | 60 | 3 | 2000 | 1 | 0.9 | D | 3 | 1 | 40 |
| 350 | Zn—Ni | 20 | 0.5 | 8 | 100 | 60 | 3 | 2000 | 1 | 0.9 | D | 3 | 1 | 40 |
| 351 | Zn—Ni | 20 | 0.5 | 8 | 250 | 60 | 3 | 2000 | 1 | 0.9 | D | 3 | 1 | 40 |
| 352 | Zn—Ni | 20 | 0.5 | 8 | 300 | 60 | 3 | 2000 | 1 | 0.9 | D | 3 | 1 | 40 |
| 353 | Zn—Ni | 20 | 0.5 | 12 | 50 | 60 | 3 | 2000 | 1 | 0.9 | D | 3 | 1 | 40 |
| 354 | Zn—Ni | 20 | 0.5 | 12 | 100 | 60 | 3 | 2000 | 1 | 0.9 | D | 3 | 1 | 40 |
| 355 | Zn—Ni | 20 | 0.5 | 12 | 250 | 60 | 3 | 2000 | 1 | 0.9 | D | 3 | 1 | 40 |
| 356 | Zn—Ni | 20 | 0.5 | 12 | 300 | 60 | 3 | 2000 | 1 | 0.9 | D | 3 | 1 | 40 |
| 357 | Zn—Ni | 20 | 0.5 | 25 | 50 | 60 | 3 | 2000 | 1 | 0.9 | D | 3 | 1 | 40 |
| 358 | Zn—Ni | 20 | 0.5 | 25 | 100 | 60 | 3 | 2000 | 1 | 0.9 | D | 3 | 1 | 40 |
| 359 | Zn—Ni | 20 | 0.5 | 25 | 250 | 60 | 3 | 2000 | 1 | 0.9 | D | 3 | 1 | 40 |
| 360 | Zn—Ni | 20 | 0.5 | 25 | 300 | 60 | 3 | 2000 | 1 | 0.9 | D | 3 | 1 | 40 |

| | Resin film | | Baking | | Characteristics | | | | |
|---|---|---|---|---|---|---|---|---|---|
| Sample No.* | Silica Parts by weight | Resin deposit, g/m$^2$ | Baking temperature, °C. | Stability of chromating solution | Chromium dessolution, mg/m$^2$ (as metallic Cr) | Appearance of deposited film | Water-resistance secondary adhesion | Corrosion resistance | Workability |
| 341 | 40 | 1 | 150 | good | 0 | ○ | ⊙ | ⊙ | ⊙ |
| 342 | 40 | 1 | 150 | good | 0 | ○ | ⊙ | ⊙ | ⊙ |
| 343 | 40 | 1 | 150 | good | 0 | ○ | ⊙ | ⊙ | ⊙ |
| 344 | 40 | 1 | 150 | good | 0 | ○ | ⊙ | ⊙ | ⊙ |
| 345 | 40 | 1 | 150 | good | 0 | ○ | ⊙ | ⊙ | ⊙ |
| 346 | 40 | 1 | 150 | good | 0 | ○ | ⊙ | ⊙ | ⊙ |
| 347 | 40 | 1 | 150 | good | 0 | ○ | ⊙ | ⊙ | ⊙ |
| 348 | 40 | 1 | 150 | good | 0 | ○ | ⊙ | ⊙ | ⊙ |
| 349 | 40 | 1 | 150 | good | 0 | ○ | ⊙ | ⊙ | ⊙ |
| 350 | 40 | 1 | 150 | good | 0 | ○ | ⊙ | ⊙ | ⊙ |
| 351 | 40 | 1 | 150 | good | 0 | ○ | ⊙ | ⊙ | ⊙ |
| 352 | 40 | 1 | 150 | good | 0 | ○ | ⊙ | ⊙ | ⊙ |
| 353 | 40 | 1 | 150 | good | 0 | ○ | ⊙ | ⊙ | ⊙ |
| 354 | 40 | 1 | 150 | good | 0 | ○ | ⊙ | ⊙ | ⊙ |
| 355 | 40 | 1 | 150 | good | 0 | ○ | ⊙ | ⊙ | ⊙ |
| 356 | 40 | 1 | 150 | good | 0 | ○ | ⊙ | ⊙ | ⊙ |

TABLE 3-3-continued

| | | | | | | | | | |
|---|---|---|---|---|---|---|---|---|---|
| 357 | 40 | 1 | 150 | good | 0 | ○ | ⊙ | ⊙ | ⊙ |
| 358 | 40 | 1 | 150 | good | 0 | ○ | ⊙ | ⊙ | ⊙ |
| 359 | 40 | 1 | 150 | good | 0 | ○ | ⊙ | ⊙ | ⊙ |
| 360 | 40 | 1 | 150 | good | 0 | ○ | ⊙ | ⊙ | ⊙ |

*Sample Nos. 341–360 were all within the scope of the invention.

TABLE 3-4

| | Substrate plate | | Chromate film | | | | Resin film | | | | | |
|---|---|---|---|---|---|---|---|---|---|---|---|---|
| | | | | | | | Epoxy resin | | Dialkanolamine | | Silane coupling agent | |
| Sample No.* | Plate type | Plate deposit, g/m² | $Cr^{3+}$/T-Cr ratio | T-Cr/ZnO ratio | $SiO_2$/T-Cr ratio (%) | Chromate deposit, mg/m² (as metallic Cr) | Type | Epoxy equivalent | Type | No. of moles | Type | Parts by weight |
| 361 | Zn—Ni | 20 | 0.5 | 4 | 50 | 60 | 3 | 2000 | 1 | 0.9 | D | 3 |
| 362 | Zn—Ni | 20 | 0.5 | 4 | 100 | 60 | 3 | 2000 | 1 | 0.9 | D | 3 |
| 363 | Zn—Ni | 20 | 0.5 | 4 | 250 | 60 | 3 | 2000 | 1 | 0.9 | D | 3 |
| 364 | Zn—Ni | 20 | 0.5 | 4 | 300 | 60 | 3 | 2000 | 1 | 0.9 | D | 3 |
| 365 | Zn—Ni | 20 | 0.5 | 6 | 50 | 60 | 3 | 2000 | 1 | 0.9 | D | 3 |
| 366 | Zn—Ni | 20 | 0.5 | 6 | 100 | 60 | 3 | 2000 | 1 | 0.9 | D | 3 |
| 367 | Zn—Ni | 20 | 0.5 | 6 | 250 | 60 | 3 | 2000 | 1 | 0.9 | D | 3 |
| 368 | Zn—Ni | 20 | 0.5 | 6 | 300 | 60 | 3 | 2000 | 1 | 0.9 | D | 3 |
| 369 | Zn—Ni | 20 | 0.5 | 8 | 50 | 60 | 3 | 2000 | 1 | 0.9 | D | 3 |
| 370 | Zn—Ni | 20 | 0.5 | 8 | 100 | 60 | 3 | 2000 | 1 | 0.9 | D | 3 |
| 371 | Zn—Ni | 20 | 0.5 | 8 | 250 | 60 | 3 | 2000 | 1 | 0.9 | D | 3 |
| 372 | Zn—Ni | 20 | 0.5 | 8 | 300 | 60 | 3 | 2000 | 1 | 0.9 | D | 3 |
| 373 | Zn—Ni | 20 | 0.5 | 12 | 50 | 60 | 3 | 2000 | 1 | 0.9 | D | 3 |
| 374 | Zn—Ni | 20 | 0.5 | 12 | 100 | 60 | 3 | 2000 | 1 | 0.9 | D | 3 |
| 375 | Zn—Ni | 20 | 0.5 | 12 | 250 | 60 | 3 | 2000 | 1 | 0.9 | D | 3 |
| 376 | Zn—Ni | 20 | 0.5 | 12 | 300 | 60 | 3 | 2000 | 1 | 0.9 | D | 3 |
| 377 | Zn—Ni | 20 | 0.5 | 25 | 50 | 60 | 3 | 2000 | 1 | 0.9 | D | 3 |
| 378 | Zn—Ni | 20 | 0.5 | 25 | 100 | 60 | 3 | 2000 | 1 | 0.9 | D | 3 |
| 379 | Zn—Ni | 20 | 0.5 | 25 | 250 | 60 | 3 | 2000 | 1 | 0.9 | D | 3 |
| 380 | Zn—Ni | 20 | 0.5 | 25 | 300 | 60 | 3 | 2000 | 1 | 0.9 | D | 3 |

| | Resin film | | | | | Characteristics | | | | |
|---|---|---|---|---|---|---|---|---|---|---|
| | Amino resin | | Silica | Resin | Baking | | Chromium | Appearance | Water-resistance | Corro- | |
| Sample No.* | Type | Parts by weight | Parts by weight | deposit, g/m² | temperature, °C. | Stability of chromating solution | dessolution, mg/m² (as metallic Cr) | of deposited film | secondary adhesion | sion resistance | Work-ability |
| 361 | 1 | 40 | 40 | 1 | 150 | good | 0 | ○ | ⊙ | ⊙ | ⊙ |
| 362 | 1 | 40 | 40 | 1 | 150 | good | 0 | ○ | ⊙ | ⊙ | ⊙ |
| 363 | 1 | 40 | 40 | 1 | 150 | good | 0 | ○ | ⊙ | ⊙ | ⊙ |
| 364 | 1 | 40 | 40 | 1 | 150 | good | 0 | ○ | ⊙ | ⊙ | ⊙ |
| 365 | 1 | 40 | 40 | 1 | 150 | good | 0 | ○ | ⊙ | ⊙ | ⊙ |
| 366 | 1 | 40 | 40 | 1 | 150 | good | 0 | ○ | ⊙ | ⊙ | ⊙ |
| 367 | 1 | 40 | 40 | 1 | 150 | good | 0 | ○ | ⊙ | ⊙ | ⊙ |
| 368 | 1 | 40 | 40 | 1 | 150 | good | 0 | ○ | ⊙ | ⊙ | ⊙ |
| 369 | 1 | 40 | 40 | 1 | 150 | good | 0 | ○ | ⊙ | ⊙ | ⊙ |
| 370 | 1 | 40 | 40 | 1 | 150 | good | 0 | ○ | ⊙ | ⊙ | ⊙ |
| 371 | 1 | 40 | 40 | 1 | 150 | good | 0 | ○ | ⊙ | ⊙ | ⊙ |
| 372 | 1 | 40 | 40 | 1 | 150 | good | 0 | ○ | ⊙ | ⊙ | ⊙ |
| 373 | 1 | 40 | 40 | 1 | 150 | good | 0 | ○ | ⊙ | ⊙ | ⊙ |
| 374 | 1 | 40 | 40 | 1 | 150 | good | 0 | ○ | ⊙ | ⊙ | ⊙ |
| 375 | 1 | 40 | 40 | 1 | 150 | good | 0 | ○ | ⊙ | ⊙ | ⊙ |
| 376 | 1 | 40 | 40 | 1 | 150 | good | 0 | ○ | ⊙ | ⊙ | ⊙ |
| 377 | 1 | 40 | 40 | 1 | 150 | good | 0 | ○ | ⊙ | ⊙ | ⊙ |
| 378 | 1 | 40 | 40 | 1 | 150 | good | 0 | ○ | ⊙ | ⊙ | ⊙ |
| 379 | 1 | 40 | 40 | 1 | 150 | good | 0 | ○ | ⊙ | ⊙ | ⊙ |
| 380 | 1 | 40 | 40 | 1 | 150 | good | 0 | ○ | ⊙ | ⊙ | ⊙ |

*Sample Nos. 361–380 were all within the scope of the invention.

TABLE 3-5

| | Substrate plate | | Chromate film | | | | Resin film | | | | | |
|---|---|---|---|---|---|---|---|---|---|---|---|---|
| | | | | | | | Epoxy resin | | Dialkanolamine | | Silane coupling agent | |
| Sample No.* | Plate type | Plate deposit, g/m² | $Cr^{3+}$/T-Cr ratio | T-Cr/ZnO ratio | $SiO_2$/T-Cr ratio (%) | Chromate deposit, mg/m² (as metallic Cr) | Type | Epoxy equivalent | Type | No. of moles | Type | Parts by weight |
| 381 | Zn—Ni | 20 | 0.5 | 6 | 200 | 60 | 1 | 500 | 1 | 0.9 | D | 3 |
| 382 | Zn—Ni | 20 | 0.5 | 6 | 200 | 60 | 2 | 1000 | 1 | 0.9 | D | 3 |
| 383 | Zn—Ni | 20 | 0.5 | 6 | 200 | 60 | 4 | 3000 | 1 | 0.9 | D | 3 |
| 384 | Zn—Ni | 20 | 0.5 | 6 | 200 | 60 | 5 | 5000 | 1 | 0.9 | D | 3 |
| 385 | Zn—Ni | 20 | 0.5 | 6 | 200 | 60 | 3 | 2000 | 2 | 0.9 | D | 3 |
| 386 | Zn—Ni | 20 | 0.5 | 6 | 200 | 60 | 3 | 2000 | 1 | 0.8 | D | 3 |
| 387 | Zn—Ni | 20 | 0.5 | 6 | 200 | 60 | 3 | 2000 | 1 | 1.0 | D | 3 |
| 388 | Zn—Ni | 20 | 0.5 | 6 | 200 | 60 | 3 | 2000 | 1 | 0.9 | A | 3 |
| 389 | Zn—Ni | 20 | 0.5 | 6 | 200 | 60 | 3 | 2000 | 1 | 0.9 | B | 3 |
| 390 | Zn—Ni | 20 | 0.5 | 6 | 200 | 60 | 3 | 2000 | 1 | 0.9 | C | 3 |

TABLE 3-5-continued

| | | | | | | | | | | | | | |
|---|---|---|---|---|---|---|---|---|---|---|---|---|---|
| 391 | Zn—Ni | 20 | 0.5 | 6 | 200 | 60 | 3 | 2000 | 1 | 0.9 | E | 3 |
| 392 | Zn—Ni | 20 | 0.5 | 6 | 200 | 200 | 3 | 2000 | 1 | 0.9 | F | 3 |
| 393 | Zn—Ni | 20 | 0.5 | 6 | 200 | 200 | 3 | 2000 | 1 | 0.9 | D | 0.5 |
| 394 | Zn—Ni | 20 | 0.5 | 6 | 200 | 200 | 3 | 2000 | 1 | 0.9 | D | 10 |
| 395 | Zn—Ni | 20 | 0.5 | 6 | 200 | 200 | 3 | 2000 | 1 | 0.9 | D | 3 |
| 396 | Zn—Ni | 20 | 0.5 | 6 | 200 | 200 | 3 | 2000 | 1 | 0.9 | D | 3 |
| 397 | Zn—Ni | 20 | 0.5 | 6 | 200 | 200 | 3 | 2000 | 1 | 0.9 | D | 3 |
| 398 | Zn—Ni | 20 | 0.5 | 6 | 200 | 200 | 3 | 2000 | 1 | 0.9 | D | 3 |
| 399 | Zn—Ni | 20 | 0.5 | 6 | 200 | 60 | 3 | 2000 | 1 | 0.9 | D | 3 |
| 400 | Zn—Ni | 20 | 0.5 | 6 | 200 | 60 | 3 | 2000 | 1 | 0.9 | D | 3 |

| | Resin film | | | | | Characteristics | | | | |
|---|---|---|---|---|---|---|---|---|---|---|
| | Amino resin | | Silica | Resin | Baking | Stability of | Chromium | Appearance | Water-resistance | Corro- | Work- |
| Sample | | Parts by | Parts by | deposit, | temper-ature, | chromating | dessolution, mg/m$^2$ | of deposited | secondary | sion | ability |
| No.* | Type | weight | weight | g/m$^2$ | °C. | solution | (as metallic Cr) | film | adhesion | resistance | |
| 381 | 1 | 40 | 40 | 1 | 150 | good | 0 | ○ | ⊙ | ⊙ | ⊙ |
| 382 | 1 | 40 | 40 | 1 | 150 | good | 0 | ○ | ⊙ | ⊙ | ⊙ |
| 383 | 1 | 40 | 40 | 1 | 150 | good | 0 | ○ | ⊙ | ⊙ | ⊙ |
| 384 | 1 | 40 | 40 | 1 | 150 | good | 0 | ○ | ⊙ | ⊙ | ⊙ |
| 385 | 1 | 40 | 40 | 1 | 140 | good | 0 | ○ | ⊙ | ⊙ | ⊙ |
| 386 | 1 | 40 | 40 | 1 | 140 | good | 0 | ○ | ⊙ | ⊙ | ⊙ |
| 387 | 1 | 40 | 40 | 1 | 200 | good | 0 | ○ | ⊙ | ⊙ | ⊙ |
| 388 | 1 | 40 | 40 | 1 | 200 | good | 0 | ○ | ⊙ | ⊙ | ⊙ |
| 389 | 1 | 40 | 40 | 1 | 200 | good | 0 | ○ | ⊙ | ⊙ | ⊙ |
| 390 | 1 | 40 | 40 | 1 | 150 | good | 0 | ○ | ⊙ | ⊙ | ⊙ |
| 391 | 1 | 40 | 40 | 1 | 150 | good | 0 | ○ | ⊙ | ⊙ | ⊙ |
| 392 | 1 | 40 | 40 | 1 | 150 | good | 0 | ○ | ⊙ | ⊙ | ⊙ |
| 393 | 1 | 40 | 40 | 1 | 150 | good | 0 | ○ | ⊙ | ⊙ | ⊙ |
| 394 | 1 | 40 | 40 | 1 | 150 | good | 0 | ○ | ⊙ | ⊙ | ⊙ |
| 395 | 2 | 40 | 40 | 1 | 150 | good | 0 | ○ | ⊙ | ⊙ | ⊙ |
| 396 | 1 | 5 | 40 | 1 | 150 | good | 0 | ○ | ○ | ⊙ | ⊙ |
| 397 | 1 | 70 | 40 | 1 | 150 | good | 0 | ○ | ○ | ⊙ | ⊙ |
| 398 | 1 | 40 | 10 | 1 | 150 | good | 0 | ⊙ | ⊙ | ⊙ | ⊙ |
| 399 | 1 | 40 | 100 | 1 | 150 | good | 0 | ⊙ | ⊙ | ⊙ | ⊙ |
| 400 | 1 | 40 | 150 | 1 | 150 | good | 0 | ○ | ⊙ | ⊙ | ⊙ |

*Sample Nos. 381–400 were all within the scope of the invention.

TABLE 3-6

| | Substrate plate | | Chromate film | | | | Resin film | | | | Silane coupling agent | |
|---|---|---|---|---|---|---|---|---|---|---|---|---|
| | | Plate | Cr$^{3+}$/ | T-Cr/ | SiO$_2$/ | Chromate | Epoxy resin | | Dialkanolamine | | | |
| Sample | Plate | deposit, | T-Cr | ZnO | T-Cr | deposit, mg/m$^2$ | | Epoxy | | No. of | | Parts by |
| No.* | type | g/m$^2$ | ratio | ratio | ratio (%) | (as metallic Cr) | Type | equivalent | Type | moles | Type | weight |
| 401 | Zn—Ni | 20 | 0.5 | 6 | 200 | 100 | 3 | 2000 | 1 | 0.9 | D | 3 |
| 402 | Zn—Ni | 20 | 0.5 | 6 | 200 | 100 | 3 | 2000 | 1 | 0.9 | D | 3 |
| 403 | Zn—Ni | 20 | 0.5 | 6 | 200 | 100 | 3 | 2000 | 1 | 0.9 | D | 3 |
| 404 | Zn—Ni | 20 | 0.5 | 6 | 200 | 30 | 3 | 2000 | 1 | 0.9 | D | 3 |
| 405 | Zn—Fe | 40 | 0.5 | 6 | 200 | 60 | 3 | 2000 | 2 | 0.9 | D | 3 |
| 406 | Zn—Al | 40 | 0.5 | 6 | 200 | 60 | 3 | 2000 | 1 | 0.8 | D | 3 |
| 407 | Zn—Mg | 20 | 0.5 | 6 | 200 | 60 | 3 | 2000 | 1 | 1.0 | D | 3 |
| 408 | Zn—Al$_2$O$_3$ | 20 | 0.5 | 6 | 200 | 60 | 3 | 2000 | 1 | 0.9 | D | 3 |
| 409 | Zn—Mn | 20 | 0.5 | 6 | 200 | 60 | 3 | 2000 | 1 | 0.9 | D | 3 |
| 410 | Zn—Ni | 20 | 0.8 | — | — | — | — | — | — | — | — | — |
| 411 | Zn—Ni | 20 | 1.0 | — | — | — | — | — | — | — | — | — |
| 412 | Zn—Ni | 20 | 0 | 25 | 0 | 60 | 3 | 2000 | 1 | 0.9 | D | 3 |
| 413 | Zn—Ni | 20 | 0.03 | 25 | 0 | 60 | 3 | 2000 | 1 | 0.9 | D | 3 |
| 414 | Zn—Ni | 20 | 0.5 | 6 | 0 | 60 | 6 | 250 | 1 | 0.9 | D | 3 |
| 415 | Zn—Ni | 20 | 0.5 | 6 | 40 | 60 | 7 | 5000 | 1 | 0.9 | D | 3 |
| 416 | Zn—Ni | 20 | 0.5 | 6 | 350 | 60 | 3 | 2000 | 1 | 0.5 | D | 3 |
| 417 | Zn—Ni | 20 | 0.5 | 6 | 200 | 60 | 3 | 2000 | 1 | 1.2 | D | 3 |
| 418 | Zn—Ni | 20 | 0.5 | 1 | — | — | — | — | — | — | — | — |
| 419 | Zn—Ni | 20 | 0.5 | 3 | — | — | — | — | — | — | — | — |
| 420 | Zn—Ni | 20 | 0.5 | 28 | 200 | 60 | 3 | 2000 | 1 | 0.9 | D | 3 |
| 421 | Zn—Ni | 20 | 0.5 | 50 | 200 | 60 | 3 | 2000 | 1 | 0.9 | D | 3 |

| | Resin film | | | | | Characteristics | | |
|---|---|---|---|---|---|---|---|---|
| | Amino resin | | Silica | Resin | Baking | Stability of | Chromium | Appearance of | Water-resistance |
| Sample | | Parts by | Parts by | deposit, | temperature, | chromating | dessolution, mg/m$^2$ | deposited | secondary |
| No.* | Type | weight | weight | g/m$^2$ | °C. | solution | (as metallic Cr) | film | adhesion |
| 401 | 1 | 40 | 40 | 1 | 150 | good | 0 | ○ | ⊙ |
| 402 | 1 | 40 | 40 | 1 | 150 | good | 0 | ○ | ⊙ |
| 403 | 1 | 40 | 40 | 1 | 150 | good | 0 | ○ | ⊙ |
| 404 | 1 | 40 | 40 | 1 | 150 | good | 0 | ○ | ⊙ |
| 405 | 1 | 40 | 40 | 1 | 140 | good | 0 | ○ | ⊙ |
| 406 | 1 | 40 | 40 | 1 | 140 | good | 0 | ○ | ⊙ |
| 407 | 1 | 40 | 40 | 1 | 200 | good | 0 | ○ | ⊙ |
| 408 | 1 | 40 | 40 | 1 | 200 | good | 0 | ○ | ⊙ |

TABLE 3-6-continued

| | | | | | | | | Characteristics | |
|---|---|---|---|---|---|---|---|---|---|
| Sample No.* | | | | | | | | Corrosion resistance | Work-ability | Corrosion resistance after working |
| 409 | 1 | 40 | 40 | 1 | 200 | good | 0 | ○ | ◎ |
| 410 | — | — | — | — | — | gelled | — | — | — |
| 411 | — | — | — | — | — | gelled | — | — | — |
| 412 | 1 | 40 | 40 | 1 | 150 | good | 40 | ◎ | ◎ |
| 413 | 1 | 40 | 40 | 1 | 150 | good | 20 | ◎ | ◎ |
| 414 | 1 | 40 | 40 | 1 | 150 | good | 0 | △~X | △ |
| 415 | 2 | 40 | 40 | 1 | 150 | good | 0 | △~X | △ |
| 416 | 1 | 40 | 40 | 1 | 150 | good | 0 | △~X | △ |
| 417 | 1 | 40 | 40 | 1 | 150 | good | 0 | △~X | △ |
| 418 | — | — | — | — | — | gelled | — | — | — |
| 419 | — | — | — | — | — | gelled | — | — | — |
| 420 | 1 | 40 | 40 | 1 | 150 | good | 10 | ◎ | ◎ |
| 421 | 1 | 40 | 40 | 1 | 150 | good | 10 | ◎ | ◎ |

| Sample No.* | Corrosion resistance | Work-ability | Corrosion resistance after working |
|---|---|---|---|
| 401 | ◎ | ◎ | ◎ |
| 402 | ◎ | ◎ | ◎ |
| 403 | ◎ | ◎ | ◎ |
| 404 | ◎ | ◎ | ◎ |
| 405 | ◎ | ◎ | ◎ |
| 406 | ◎ | ◎ | ◎ |
| 407 | ◎ | ◎ | ◎ |
| 408 | ◎ | ◎ | ◎ |
| 409 | ◎ | ◎ | ◎ |
| 410 | — | — | — |
| 411 | — | — | — |
| 412 | ○ | ◎ | ◎ |
| 413 | ○ | ◎ | ◎ |
| 414 | △ | ◎ | △ |
| 415 | ○ | ◎ | △ |
| 416 | ◎ | ◎ | ◎ |
| 417 | △ | ◎ | ○ |
| 418 | — | — | — |
| 419 | — | — | — |
| 420 | ◎ | ◎ | ◎ |
| 421 | ◎ | ◎ | ◎ |

*Sample Nos. 401-409 were all within the scope of the invention and sample Nos. 410-421 were comparative samples.

TABLE 3-7

| | Substrate plate | | Chromate film | | | | Resin film | | | | | | |
|---|---|---|---|---|---|---|---|---|---|---|---|---|---|
| | | Plate deposit, g/m² | Cr³⁺/ T-Cr ratio | T-Cr/ ZnO ratio | SiO₂/ T-Cr ratio (%) | Chromate deposit, mg/m² (as metallic Cr) | Epoxy resin | | Dialkanolamine | | Silane coupling agent | |
| Sample No.* | Plate type | | | | | | Type | Epoxy equivalent | Type | No. of moles | Type | Parts by weight |
| 422 | Zn—Ni | 20 | 0.5 | 6 | 250 | 60 | 3 | 2000 | 1 | 0.9 | G | 3 |
| 423 | Zn—Ni | 20 | 0.5 | 6 | 250 | 60 | 3 | 2000 | 1 | 0.9 | H | 3 |
| 424 | Zn—Ni | 20 | 0.5 | 6 | 250 | 60 | 3 | 2000 | 1 | 0.9 | D | 0.3 |
| 425 | Zn—Ni | 20 | 0.5 | 6 | 250 | 60 | 3 | 2000 | 1 | 0.9 | D | 12 |
| 426 | Zn—Ni | 20 | 0.5 | 6 | 250 | 60 | 3 | 2000 | 1 | 0.9 | D | 3 |
| 427 | Zn—Ni | 20 | 0.5 | 6 | 250 | 60 | 3 | 2000 | 1 | 0.9 | D | 3 |
| 428 | Zn—Ni | 20 | 0.5 | 6 | 250 | 60 | 3 | 2000 | 1 | 0.9 | D | 3 |
| 429 | Zn—Ni | 20 | 0.5 | 6 | 250 | 60 | 3 | 2000 | 1 | 0.9 | D | 3 |
| 430 | Zn—Ni | 20 | 0.5 | 6 | 250 | 60 | 3 | 2000 | 1 | 0.9 | D | 3 |
| 431 | Zn—Ni | 20 | 0.5 | 6 | 250 | 60 | 3 | 2000 | 1 | 0.9 | D | 3 |
| 432 | Zn—Ni | 20 | 0.5 | 6 | 250 | 3 | 3 | 2000 | 1 | 0.9 | D | 3 |
| 433 | Zn—Ni | 20 | 0.5 | 6 | 250 | 800 | 3 | 2000 | 1 | 0.9 | D | 3 |

| | Resin film | | | | | Characteristics | | | | |
|---|---|---|---|---|---|---|---|---|---|---|
| | Amino resin | | Silica | Resin deposit, g/m² | Baking temperature, °C | Stability of chromating solution | Chromium dessolution, mg/m² (as metallic Cr) | Appearance of deposited film | Water-resistance secondary adhesion | Corrosion resistance | Work-ability |
| Sample No.* | Type | Parts by weight | Parts by weight | | | | | | | | |
| 422 | 1 | 40 | 40 | 1 | 150 | paint gelled | — | — | — | — | — |
| 423 | 1 | 40 | 40 | 1 | 150 | paint gelled | — | — | — | — | — |
| 424 | 1 | 40 | 40 | 1 | 150 | good | 0 | △ | △~X | ○ | ◎ |
| 425 | 1 | 40 | 40 | 1 | 150 | good | 0 | △~X | △~X | ○ | ◎ |
| 426 | 1 | 2 | 40 | 1 | 150 | good | 0 | ◎ | △~X | △ | △ |
| 427 | 1 | 80 | 40 | 1 | 150 | good | 0 | X | △~X | ○ | ◎ |
| 428 | 1 | 40 | 5 | 5 | 150 | good | 0 | ○ | ◎ | X | ◎ |
| 429 | 1 | 40 | 300 | 5 | 150 | good | 0 | ◎ | X | ○ | X |
| 430 | 1 | 40 | 40 | 5 | 150 | good | 0 | X | ◎ | ◎ | X |
| 431 | 1 | 40 | 40 | 0.05 | 150 | good | 0 | ◎ | ◎ | X | ◎ |
| 432 | 1 | 40 | 40 | 1 | 150 | good | 0 | ◎ | X | X | △ |

TABLE 3-7-continued

| 433 | 1 | 40 | 40 | 1 | 150 | good | 0 | Δ | Δ | ⊙ | X |

*Sample Nos. 422–433 were comparative samples.

What is claimed is:

1. A steel plate with an organic coating having improved corrosion resistance comprising a zinc or zinc alloy plated steel plate having on its surface a chromate film deposited in an amount of 5–500 mg/m² in terms of metallic chromium, said chromate film being overlaid with a solid film adhered in an amount of 0.1–4.0 g/m² and formed of a paint composition consisting of 100 parts by weight of a modified epoxy resin having 0.8–1.0 mole of a dialkanolamine per equivalent of epoxy groups in an epichlorohydrin-bisphenol A epoxy resin having 5–5,000 epoxy equivalents, 0.5–10 parts by weight of a silane coupling agent, 5–70 parts by weight of an amino resin, and 10–150 parts by weight of silica.

2. A steel plate according to claim 1 wherein said amino resin is benzoguanamine resin.

3. A steel plate according to claim 1 wherein said chromate film is present in an amount of 10–200 mg/m² in terms of metallic chromium.

4. A steel plate according to claim 1 wherein said silane coupling agent is incorporated in an amount of 1–5 parts by weight per 100 parts by weight of said modified epoxy resin.

5. A steel plate according to claim 1 wherein said amino resin is incorporated in an amount of 10–40 parts by weight per 100 parts by weight of said modified epoxy resin.

6. A steel plate according to claim 1 wherein said solid film is present in an amount of 0.3–2.0 g/m².

7. A steel plate according to claim 1 wherein said dialkanolamine is at least one member selected from the group consisting of diethanolamine, dipropanolamine and dibutanolamine.

8. A steel plate according to claim 1 wherein said silane coupling agent is represented by the following general formula (I):

$$X_{4-n}Si-(OR)_n \qquad (I)$$

wherein is an integer of 1–3; X is at least one functional group selected from the group consisting of a vinyl group, a mercapto group, an epoxy group and a chloride group; and OR is at least one group selected from the group consisting of a methoxy group and an ethoxy group.

9. A steel place with an organic coating having improved corrosion resistance comprising a steel plate at least one side of which is plated with zinc or a zinc alloy and thereafter coated with a chromium solution that is adhered in an amount of 5–500 mg/m² in terms of metallic chromium, has a molar ratio of trivalent chromium to total chromuium ($Cr^{3+}$/T-Cr) in the range of 0.05–0.7 and contains zinc oxide in such an amount that the molar ratio of total chromium to zinc oxide (T-Cr/ZnO) is in the range of 4–25, the applied chromate solution having a baked solid film overlay present in an amount of 0.1–4.0 g/m² and comprising a paint composition consisting of 100 parts by weight of a modified epoxy resin having 0.8 to 1.0 mole of a dialkanolamine per equivalent of epoxy groups in an epichlorohydrin-bisphenol A epoxy resin having 500–5,000 epoxy equivalents, 0.5–10 parts by weight of a silane coupling agent, 5–70 parts by weight of an amino resin, and 10–150 parts by weight on a solids base of silica.

10. A steel plate with an organic coating having improved corrosion resistance comprising a steel plate at least one side of which is plated with zinc or a zinc alloy and thereafter coated with a chromate solution that is adhered in an amount of 5–500 mg/m² in terms of metallic chromium, has a molar ratio of trivalent chromium to total chromuium ($Cr^{3+}$/T-Cr) in the range of 0.05–0.7 and contains zinc oxide in such an amount that the molar ratio of total chromium to zinc oxide (T-Cr/ZnO) is in the range of 4–25, and contains a silica sol in an amount of 50–300% of total chromium, the applied chromate solution having a baked solid film overlay present in an amount of 0.1–4.0 g/m² and comprising a paint composition consisting of 100 parts by weight of a modified epoxy resin having 0.8–1.0 mole of a dialkanolamine per equivalent of epoxy groups in an epichlorohydrin-bisphenol A epoxy resin having 500–5,000 epoxy equivalents, 0.5–10 parts by weight of a silane coupling agent, 5–70 parts by weight of an amino resin, and 10–150 parts by weight on a solids basis of silica.

11. A steel plate according to claim 9 or 10 wherein said chromate solution comprises deposit of 10–200 mg/m² in terms of metallic chromium.

12. A steel plate according to claim 9 or 10 wherein said silane coupling agent is incorporated in an amount of 1–5 parts by weight per 100 parts by weight of said modified epoxy resin.

13. A steel plate according to claim 9 or 10 wherein said amino resin is incorporated in an amount of 10–40 parts by weight per 100 parts by weight of said modified epoxy resin.

14. A steel plate according to claim 9 or 10 wherein said solid film is present in an amount of 0.3–2.0 g/m².

15. A steel plate according to claim 9 or 10 wherein said dialkanolamine is at least one member selected from the group consisting of diethanolamine, dipropanolamine and dibutanolamine.

16. A steel plate according to claim 9 or 10 wherein said silane coupling agent is represented by the following general formula (I):

$$X_{4-n}Si-(OR)_n \qquad (I)$$

where n is an integer of 1–3; X is at least one functional group selected from the group consisting of a vinyl group, a mercapto group, an epoxy group and a chloride group; and OR is at least one group selected from the group consisting of a methoxy group and an ethoxy group.

17. A steel plate according to claim 9 or 10 wherein said amino resin is at least one member selected from the group consisting of a benzoguanamine resin, a melamine resin and the polycondensation product of urea and formaldehyde.

* * * * *

UNITED STATES PATENT AND TRADEMARK OFFICE
CERTIFICATE OF CORRECTION

PATENT NO. : 5,147,730

DATED : September 15, 1992

INVENTOR(S) : Hideo Ogishi et al

It is certified that error appears in the above-identified patent and that said Letters Patent is hereby corrected as shown below:

In Columns 13 and 14, at "Table 1-1-continued", first line, in the column following "Zn-Fe", please change "20" to --40--, on the same line in the column following "1", please insert --1.0--, and in the second line, in the column following "1", please insert --1.0--.

In Column 17, at "Table 2-1, under the heading "$Cr^{3+}/$T-Cr ratio", tenth line down, please change "0.5" to --0.6--.

In Column 33, line 44, after "wherein", please insert --n--.

In Column 34, line 17, please add --,-- after "0.05-0.7" and delete "and".

UNITED STATES PATENT AND TRADEMARK OFFICE
CERTIFICATE OF CORRECTION

PATENT NO. : 5,147,730

DATED : September 15, 1992

INVENTOR(S) : Hideo Ogishi et al

It is certified that error appears in the above-identified patent and that said Letters Patent is hereby corrected as shown below:

Column 33,
  line 56, please change "chromuium" to --chromium--.

Signed and Sealed this

Fifth Day of October, 1993

BRUCE LEHMAN

*Attest:*

*Attesting Officer*    *Commissioner of Patents and Trademarks*